(12) United States Patent
Sheraizin et al.

(10) Patent No.: US 7,805,019 B2
(45) Date of Patent: *Sep. 28, 2010

(54) ENHANCEMENT OF DECOMPRESSED VIDEO

(76) Inventors: Vitaly S. Sheraizin, 28B Hamagen St., Mazkeret, Batya (IL) 76804; Semion M. Sheraizin, 28B Hamagen St., Mazkeret, Batya (IL) 76804

( * ) Notice: Subject to any disclaimer, the term of this patent is extended or adjusted under 35 U.S.C. 154(b) by 0 days.

This patent is subject to a terminal disclaimer.

(21) Appl. No.: 12/316,168

(22) Filed: Dec. 10, 2008

(65) Prior Publication Data

US 2009/0161754 A1 Jun. 25, 2009

Related U.S. Application Data

(63) Continuation of application No. 11/061,734, filed on Feb. 22, 2005, now Pat. No. 7,526,142.

(51) Int. Cl.
G06K 9/36 (2006.01)
H04N 5/14 (2006.01)

(52) U.S. Cl. ............... 382/275; 382/233; 348/699

(58) Field of Classification Search ............... 382/275, 382/300, 254, 255, 260, 251, 266, 264, 263, 382/233, 253, 168, 172, 166; 370/229; 375/240.08, 375/240.12, 240.16, 240.01, E7.094; 348/E5.067, 348/699; 347/43
See application file for complete search history.

(56) References Cited

U.S. PATENT DOCUMENTS 2,697,758 A 12/1954 Little, Jr.
3,961,133 A 6/1976 Bennett
4,855,825 A 8/1989 Haikonen et al.
4,947,255 A 8/1990 Jackson et al.
5,012,333 A 4/1991 Lee
5,126,847 A 6/1992 Kori
5,194,943 A 3/1993 Tomita et al.
5,245,445 A 9/1993 Fujisawa
5,301,016 A 4/1994 Gehrmann
5,339,171 A 8/1994 Fujisawa
5,341,442 A 8/1994 Barrett
5,384,601 A 1/1995 Yamashita et al.
5,404,174 A 4/1995 Sugahara
5,428,398 A * 6/1995 Faroudja .................. 348/452
5,467,404 A 11/1995 Vuylsteke
5,488,675 A 1/1996 Hanna (Continued)

FOREIGN PATENT DOCUMENTS

EP 0502615 9/1992

(Continued)

OTHER PUBLICATIONS

Yang, Jet al., "Noise estimation for blocking artifacts reduction in DCT coded I images", IEEE trans on circuits and systems for video. tech nolo,qy, vol. 10, No. 7,(Oct. 2000), 1116-1120.*

(Continued)

Primary Examiner—Sheela C Chawan

(57) ABSTRACT

A method and apparatus for enhancing video quality by adaptively removing distortions and ringing effects embedded in decompressed video signals. The apparatus can operate in conjunction with decoder devices installed in set-top boxes, satellite receivers, TV broadcast channel servers, digital still cameras, DVD players and recorders, large screen TV sets, media players, and the like.

45 Claims, 15 Drawing Sheets

U.S. PATENT DOCUMENTS

| | | |
|---|---|---|
| 5,491,514 A | 2/1996 | Fukada et |
| 5,491,517 A | 2/1996 | Kreitman et al. |
| 5,491,519 A | 2/1996 | Kim |
| 5,510,824 A | 4/1996 | Nelson |
| 5,537,510 A | 7/1996 | Kim |
| 5,539,475 A | 7/1996 | Sadjadian et al. |
| 5,542,008 A | 7/1996 | Sugahara et al. |
| 5,555,557 A | 9/1996 | Mailloux |
| 5,557,340 A | 9/1996 | Millward |
| 5,565,921 A | 10/1996 | Sasaki et al. |
| 5,566,251 A | 10/1996 | Hanna et al. |
| 5,586,200 A | 12/1996 | Devaney et al. |
| 5,592,226 A | 1/1997 | Dickenson et al. |
| 5,613,035 A | 3/1997 | Kim |
| 5,614,937 A | 3/1997 | Nelson |
| 5,627,580 A | 5/1997 | Nelson |
| 5,627,937 A | 5/1997 | Kim |
| 5,648,801 A | 7/1997 | Beardsley et al. |
| 5,653,234 A | 8/1997 | Kim et al. |
| 5,694,492 A | 12/1997 | Kim |
| 5,717,463 A | 2/1998 | Brailean et al. |
| 5,774,593 A | 6/1998 | Zick |
| 5,787,203 A | 7/1998 | Lee et al. |
| 5,790,195 A | 8/1998 | Oshsawa |
| 5,796,864 A | 8/1998 | Callhan |
| 5,799,111 A * | 8/1998 | Guissin ............... 382/254 |
| 5,828,776 A | 10/1998 | Lee et al. |
| 5,838,835 A | 11/1998 | Martens |
| 5,844,607 A | 12/1998 | Gebler et al. |
| 5,844,614 A | 12/1998 | Chong et al. |
| 5,845,012 A | 12/1998 | Jung |
| 5,847,766 A | 12/1998 | Peak |
| 5,847,772 A | 12/1998 | Wells |
| 5,850,294 A | 12/1998 | Apostopoulos et al. |
| 5,852,475 A | 12/1998 | Gutpa et al. |
| 5,870,501 A | 2/1999 | Kim |
| 5,881,174 A | 3/1999 | Kim |
| 5,883,983 A | 3/1999 | Lee et al. |
| 5,901,178 A | 5/1999 | Lee et al. |
| 5,914,748 A | 6/1999 | Parulski |
| 5,974,159 A | 10/1999 | Lubin et al. |
| 5,982,926 A | 11/1999 | Kuo et al. |
| 5,991,464 A | 11/1999 | Hsu et al. |
| 5,995,656 A | 11/1999 | Kim |
| 6,005,626 A | 12/1999 | Ding |
| 6,014,172 A | 1/2000 | Niesen |
| 6,037,986 A | 3/2000 | Gouliardon |
| 6,055,340 A | 4/2000 | Nagao |
| 6,094,511 A | 7/2000 | Metcalfe |
| 6,097,848 A | 8/2000 | Salvati |
| 6,100,625 A | 8/2000 | Yamamoto |
| 6,130,723 A | 10/2000 | Medin |
| 6,191,772 B1 | 2/2001 | Mical et al. |
| 6,229,925 B1 | 5/2001 | Alexandre et al. |
| 6,236,751 B1 | 5/2001 | Farrell |
| 6,259,489 B1 | 7/2001 | Flannaghan et al. |
| 6,282,299 B1 | 8/2001 | Tewfik et al. |
| 6,320,676 B1 | 11/2001 | Yoshidome |
| 6,366,705 B1 | 4/2002 | Chiu et al. |
| 6,385,647 B1 | 5/2002 | Willis et al. |
| 6,404,460 B1 | 6/2002 | Chen et al. |
| 6,463,173 B1 | 10/2002 | Tretter |
| 6,466,912 B1 | 10/2002 | Johnston |
| 6,473,532 B1 | 10/2002 | Sheraizin |
| 6,509,158 B1 | 1/2003 | Schwartzz |
| 6,522,425 B2 | 2/2003 | Yoshidome |
| 6,554,181 B1 | 4/2003 | Dammers et al. |
| 6,559,826 B1 | 5/2003 | Mendelson et al. |
| 6,567,116 B1 | 5/2003 | Aman et al. |
| 6,580,825 B2 | 6/2003 | Bhaskar |
| 6,610,256 B2 | 8/2003 | Schwartz |
| 6,628,327 B1 | 9/2003 | Aoki et al. |
| 6,643,398 B2 | 11/2003 | Moriwaki |
| 6,707,487 B1 | 3/2004 | Aman |
| 6,728,317 B1 | 4/2004 | Demos |
| 6,753,929 B1 | 6/2004 | Sheraizin |
| 6,757,449 B1 | 6/2004 | Loce |
| 6,782,287 B2 | 8/2004 | Greszczuk |
| 6,835,693 B2 | 12/2004 | Bourdelais et al. |
| 6,845,181 B2 | 1/2005 | Dupin et al. |
| 6,847,391 B1 | 1/2005 | Kassatly |
| 6,873,442 B1 | 3/2005 | Gindele et al. |
| 6,940,545 B1 | 9/2005 | Ray et al. |
| 6,940,903 B2 * | 9/2005 | Zhao et al. ............ 375/240.08 |
| 6,970,506 B2 | 11/2005 | Kim et al. |
| 7,003,174 B2 | 2/2006 | Kryukov et al. |
| 7,049,074 B2 | 5/2006 | Schwartz |
| 7,075,993 B2 | 7/2006 | O'Brien |
| 7,087,021 B2 | 8/2006 | Paternostro |
| 7,110,601 B2 | 9/2006 | Yanagisawa |
| 7,133,451 B2 * | 11/2006 | Kim et al. ............ 375/240.16 |
| 7,139,425 B2 | 11/2006 | Takashi |
| 7,164,717 B2 * | 1/2007 | Katsavounidis et al. 375/240.12 |
| 7,184,071 B2 | 2/2007 | Chellappa et al. |
| 7,221,706 B2 * | 5/2007 | Zhao et al. ............ 375/240.08 |
| 7,221,805 B1 | 5/2007 | Bachelder |
| 7,526,142 B2 | 4/2009 | Sheraizin et al. |
| 7,639,892 B2 | 12/2009 | Sheraizin et al. |
| 7,742,108 B2 | 6/2010 | Sheraizin et al. |
| 2001/0003545 A1 | 6/2001 | Hong |
| 2002/0015508 A1 | 2/2002 | Hannigan et al. |
| 2002/0122494 A1 | 9/2002 | Sheraizin |
| 2002/0140854 A1 | 10/2002 | Lan |
| 2002/0181598 A1 | 12/2002 | Vetro et al. |
| 2003/0107681 A1 | 6/2003 | Otawara et al. |
| 2003/0122969 A1 | 7/2003 | Higuchi |
| 2003/0152283 A1 | 8/2003 | Moriwaki |
| 2004/0091145 A1 | 5/2004 | Kohashi |
| 2004/0184673 A1 | 9/2004 | Watanabe |
| 2004/0190789 A1 | 9/2004 | Liu et al. |
| 2005/0013485 A1 | 1/2005 | Masaki |
| 2005/0259185 A1 | 11/2005 | Kim et al. |
| 2006/0013503 A1 | 1/2006 | Kim |

FOREIGN PATENT DOCUMENTS

| | | |
|---|---|---|
| EP | 0729117 | 8/1996 |
| GB | 1503612 | 3/1978 |
| JP | 55-71363 | 5/1980 |
| JP | 6-133221 | 7/1985 |
| JP | 6-1333221 | 8/1986 |
| JP | 01206775 | 8/1989 |
| JP | 4-83480 | 3/1992 |
| JP | 6-133221 | 5/1994 |
| JP | 08-191440 | 7/1996 |
| WO | WO00/19726 | 4/2000 |

OTHER PUBLICATIONS

"Notice of Allowance", U.S. Appl. No. 11/027,674, (Feb. 24, 2009),16 pages.

"Non Final Office Action", U.S. Appl. No. 12/196,180, (Apr. 2, 2009),17 pages.

Belkacem-Boussaid, "A New Image Smoothing Method Based on a Simple Model of Spatial Processing in the Earl Stages of Human Vision", *IEEE Trans. on Image Proc.*, vol. 9, No. 2,(Feb. 2000),220-226.

Chan, "A practical postprocessing technique for real-time block-based coding sytem", *IEEE trans on circuits and systems for video technology*, vol. 8, No. 1,(Feb. 1998),4-8.

Liu, et al., "A new postprocessing technique for the block based DCT coding based on the convex-projection theory", *IEEE trans on consumer electronics*, vol. 4, No. 3,(Aug. 1998),1054-1061.

Lee, et al., "Efficient algorithm and architecture for post processor in HDTV", *IEEE trans on consumer electronics*, vol. 44, No. 1,(Feb. 1998),16-26.

Choung, et al., "A fast adaptive image restoration filter for reducing block artifact in compressed images", *IEEE trans on consumer electronics*, vol. 44, No. 1,(Nov. 1997),1340-1346.

Jeon, B et al., "Blocking artifacts reduction in image compression with block boundary discontinuity criterion", *IEEE trans on circuits and systems for video technology*, vol. 8, No. 3,(Jun. 1998),34557.

Zhong, et al., "Derivation of prediction equation for blocking effect reduction", *IEEE trans on circuits and systems for video technology*, vol. 9, No. 3,(Apr. 1999),415-418.

Meier, et al., "Reduction of blocking artifacts in image and video coding", *IEEE trans on cicuits and systems for video technology*, (Apr. 1999),490-500.

Kim, et al., "An advanced contrast enhancement using partially overlapped sub-block histogram equalization", *IEEE Trans on circuits and systems for video technology*, vol. 11, No. 4,(Apr. 2001),475-484.

Stark, Alex J., "Adaptive image contrast enhancement Enhancement using generalizations of histogram equalization", *IEEE trans on image processing*, vol. 9, No. 5,(May 2000),889-896.

Hier, et al., "Real time locally adaptive contrast enhancement; A practical key to overcoming display and human visual system limitation", *SID digest*, (1993),491-493.

Chang, Dah-Chung "Image contrast enhancement based on local standard deviation", *IEEE trans on medical imaging*, vol. 17, No. 4,(Aug. 1998),518-531.

Kim, Yeong T., "Contrast enhancement using brightness preserving bi-histogram equalization", *IEEE trans on consumer electronics*, vol. 43, No. 1,(Feb. 1997),1-8.

Kim, Tae K., et al., "Contrast enhancement system using spatially adaptive histogram equalization with temporal filtering", *IEEE trans on consumer electronics*, vol. 44, No. 1,(Feb. 1998),82-87.

Sakaue, Shigeo et al., "Adaptive gamma processing of the video camera for expansion of the dynamic range", *IEEE trans on consumer electronics*, vol. 41, No. 3,(Aug. 1995),555-582.

Russ, John C., "The image processing handbook", *CRS press Inc.* ,(1995),674.

Talluri, Raj et al., "A Robust, Scalable, Object-Based Video Compression Technique for Very Low Bit-Rate Coding", *IEEE Transaction of Circuit and Systems for Video Technology*, (Feb. 1997),vol. 7, No. 1.

Awadkh, Al-Asmari "An Adaptive Hybrid Coding Scheme for HDTV and Digital Sequences", *IEEE Transacitons on Consumer Electronics*, vol. 42, No. 3,(Aug. 1995),926-936.

Kwok, Tung Lo "Predictive Mean Search Algorithms for Fast VQ Encoding of Images", *IEEE Transactions On Consumer Electronics*, vol. 41, No. 2,(May 1995),327-331.

Goel, James et al., "Pre-processing for MPEG Compression Using Adaptive Spatial Filtering", *IEEE Transactions on Consumer electronics*, vol. 41, No. 3,(Aug. 1995),687-698.

Feng, Jian et al., "Motion Adaptive Classified Vector Quantization for ATM Video Coding", *IEEE Transactions on Consumer Electronics,*, vol. 41, No. 2,(May 1995),322-326.

Lan, Austin Y., et al., "Scene-Context Dependent Reference—Frame Placement for MPEG Video Coding", *IEEE Transactions on Circuits and Systems for Video Technology*, vol. 9, No. 3,(Apr. 1999),478-489.

Fan, Kuo-Chin et al., "An Active Scene Analysis-Based approach for Pseudo constant Bit-Rate Video Coding", *IEEE Transactions on Circuits and Systems for Video Technology*, vol. 8, No. 2,(Apr. 1998),159-170.

Takashi, Ida et al., "Image Segmentation and Contour Detection Using Fractal Coding", *IEEE Transitions on Circuits and Systems for Video Technology*, vol. 8, No. 8,(Dec. 1998), 968-975.

Liang, Shen "A Segmentation-Based Lossless Image Coding Method for High-Resolution Medical Image Compression", *IEEE Transactions on Medical Imaging*, vol. 16, No.3,(Jun. 1997),301-316.

Munteanu, Adrian et al., "Wavelet-Based Lossless Compression of Coronary Angiographic Images", *IEEE Transactions on Medical Imaging*, vol. 18, No. 3,(Mar. 1999),272-281.

Okumura, Akira et al., "Signal Analysis and Compression performance Evaluation of Pathological Microscopic Images", *IEEE Transactions on Medical Imaging*, vol. 16, No. 6,(Dec. 1997),701-710.

Pappas, et al., "Digital Color Restoration of Old Paintings", *IEEE Trans. on Image Proc.*, vol. 9, No. 2,(Feb. 2000),291-294.

Kim, et al., "Impact of HVS Models on Model-based Halftoning", *IEEE Trans. on Image Proc.*, vol. 11, No. 3,(Mar. 2002),258-269.

Hentschel, et al., "Effective Paking Filter and is Implementation on a Programmable Architecture", *IEEE Trans. on Consumer Electronics*, vol. 47, No. 1,(Feb. 2001),33-39.

Yang, et al., "Maximum- Likelihood Parameter Estimation for Image Ringing-Artifact Removal", *IEEE Trans. on Cicuits and Systems for Video Technology*, vol. 11, No. 8,(Aug. 2001),963-973.

Immerkaer, "Use of Blur-Space of Deblurring and Edge- Preserving Noise Smoothing", *IEEE Trans on Image Proc.*, vol. 10, No. 6,(Jun. 2001),837-840.

Chan, et al., "The Digital TV Filter and Nonlinear Denoising", *IEEE Trans on Image Proc.*, vol. 10, No. 2,(Feb. 2001),231-241.

Liu, et al., "Complexity- Regularized Image Denoising", *IEEE Trans on Image Processing*, vol. 10, No. 6,(Jun. 2001),341-351.

Jostschulte, et al., "Perception Adaptive Temporal TV- noise Reduction Using Contour Preserving Prefilter Techniques", *IEEE on Consumer Electronics*, vol. 44, No. 3,(Aug. 1998),1091-1096.

Brice, Richard "Multimedia and Virtual Reality Engineering", (1997),1-8, 174-175, 280-283.

Conway, Lynn et al., "Video mirroring and Iconic Gestures: Enhancing Basic Videophones to Provide Visual Coaching and Visual Control", *IEEE Transactions on Consumer Electronics*, vol. 44, No. 2,(May 1998),388-397.

Cheol, Hong M., et al., "A new adaptive quantization method to reduce blocking effect", *IEEE transaction on consumer electronics*, vol. 44, No. 3,(Aug. 1998),768-772.

Massimo, Mancuso et al., "Advanced pre/ post processing for DCT coded images", *IEEE transactions on consumer electronics*, vol. 44, No. 3,(Aug. 1998),1039-1041.

Tao, Chen "Adaptive postfiltering of transform coeffcients for the reduction of blocking artifacts", *IEEE transactions on circuits and systems for video technology*, vol. 11, No. 5,(May 2001),594-602.

Polesel, Andrea et al., "Image Enhancement Via Adaptive Unsharp Masking", *IEEE transactions on image processing*, vol. 9, No. 3,(Mar. 2000),505-510.

Olukayode, A et al., "An algorithm for integrated noise reduction and sharpness enhancement", *IEEE Transactions on Consumer Electronics*, vol. 46, No. 3,(Aug. 2000),474-480.

Sung- Hoon, Hong "Joint video coding of MPEG-2 video programs for digital broadcasting services", *IEEE transactions on broadcasting*, vol. 44, No. 2,(Jun. 1998),153-164.

Lim, Jae "Two dimensional signal and image processing", *USA Simon & Schuster*, (1990),430.

Sherazain, et al., U.S. Appl. No. 09/524,618, filed Mar. 14, 2000.

Leonard, Eugene "Considerations regarding the use of digital data to generate video backgrounds", *SMPTE journal*, vol. 87,,(Aug. 1987),499-504.

Tescher, Andrew "Multimedia is the message", *IEEE signal processing magazine*, vol. 16, No. 1,(Jan. 1999),44-54.

Mancuso, et al., "A new post-processing algorithim to reduce artifacts in block coded images", *IEEE trans on consumer electronics*, vol. 43, No. 3,(Aug. 1997),303-307.

Yang, J et al., "Noise estimation for blocking artifacts reduction in DCT coded images", *IEEE trans on circuits and systems for video. tech nology*, vol. 10, No. 7,(Oct. 2000),1116-1120.

Kuo, et al., "Adaptive postprocessor for block encoded images", *IEEE trans on circits and systems for video technology*, vol. 5, No. 4,(Aug. 1995),298-304.

Min, et al., "A new adaptive quantization method to reduce blocking effect", *IEEE Trans on consumer electronics*, vol. 44, No. 3,(Aug. 1998),768-772.

"Restriction Requirement", U.S. Appl. No. 10/851,190, (May 19, 2009),8 pages.

"Non Final Office Action", U.S. Appl. No. 10/898,557, (Jul. 8, 2009),6 pages.

"Notice of Allowance/Base Issue Fee", U.S. Appl. No. 11/027,674, (Jul. 23, 2009),6 pages.

"Non Final Office Action", U.S. Appl. No. 10/851,190, (Sep. 1, 2009),10 pages.

"Notice of Allowance", U.S. Appl. No. 10/898,557, (Jan. 27, 2010), 6 pages.

"Notice of Allowance", U.S. Appl. No. 10/851,190, (Feb. 8, 2010), 4 pages.

"PCT Search Report & Written Opinion", WO/2006/011129, (Jul. 3, 2008), 6 pages.

"Final Office Action", U.S. Appl. No. 12/196,180, (Apr. 30, 2010), 5 pages.

"Non Final Office Action", U.S. Appl. No. 10/898,557, (Jun. 8, 2010), 5 pages.

* cited by examiner

ENHANCEMENT OF DECOMPRESSED VIDEO

This application is a continuation of and claims priority to U.S. application Ser. No. 11/061,734, filed Feb. 22, 2005 now U.S. Pat. No. 7,526,142, the disclosure of which is incorporated by reference herein in its entirety.

FIELD OF INVENTION

Described embodiments generally relate to video signal decoding and more particularly to such decoding that can improve decompressed video signals.

BACKGROUND

Video applications require that large amounts of data be transmitted at high bit rates and with a minimal amount of signal distortion. Since the available data bandwidth of a conventional transmission channel is limited, image coding techniques are utilized to compress the large amount of digital data to fit within the limited bandwidth.

Various video compression techniques are known in the art, such as those of the joint photographic expert group (JPEG), moving picture expert group (MPEG), such as the MPEG-1, MPEG-2, and MPEG-4, H-compression, such as the H.261, H.262, H.263, H.264, and the others. In most of these compression techniques, an image to be compressed is first divided into square blocks of pixels (e.g., an 8×8 pixel block). Each of these blocks is then transformed using discrete cosine transforms (DCT) into a transformed block (with 8× components) containing the DCT coefficients. These transformed blocks are then quantized (i.e. limited to one of a fixed set of possible values), and run-length encoded. Often, they are also variable length coded to further reduce the statistical redundancy present in the run-length coded data. A decoder on the receiving end of the transmission reconstructs the video stream from the transmitted, compressed signals.

As broadcast systems are required to provide an ever increasing amount of data utilizing the same data bandwidth, video signals are transmitted at lower and lower bit rates. For example, to increase the number of TV channels broadcasted to the viewers over a fixed data bandwidth, the bit rate of each channel is reduced to a rate between 1.6 Mbps to 2.2 Mbps. Unfortunately, transmitting data at too low a bit rate reduces the quality of the decompressed video stream. Furthermore, distortions are introduced into the decoded image, mainly consisting of annoying visual artifacts that are especially noticeable at medium and low bit rates. Distortions can be categorized into types, including "blocking" (or "blockness"), "blurring", and "wiggles", examples of which are shown in FIGS. 1A, 1B and 1C, to which reference is now made.

The blocking effect introduces artificial edges at the boundaries of the 8×8-pixel block, due to the quantization of the transform coefficients in each block. FIG. 1A is an image of a man's face. Unfortunately, the coloring of his face in the area marked 10 is "blocky" rather than smooth. The edges of the blocks are perceived by the human eye as unnatural geometrical contours.

Quantization of transform coefficients also causes blurring of real contours present in the image, due to the reduction of the high frequency components in the DCT transformed blocks. In FIG. 1B, the areas labeled 12 are blurred.

Distortion has another side effect, where some retained frequency components remain unbalanced, causing ripples near edges. These ripples, known as "wiggles" or "mosquito noise", cause those areas with high frequency components to appear, move and disappear at random points of the frame. This can be seen in FIG. 1C, in the areas labeled 14.

Decompressed video signals may include other noise effects as well, such as blotches and ringing.

BRIEF DESCRIPTION OF THE DRAWINGS

The described subject matter is particularly pointed out and distinctly claimed in the concluding portion of the specification. This subject matter, however, both as to organization and method of operation, together with objects, features, and advantages thereof, may better be understood by reference to the following detailed description when read with the accompanying drawings in which:

Figure 1A:
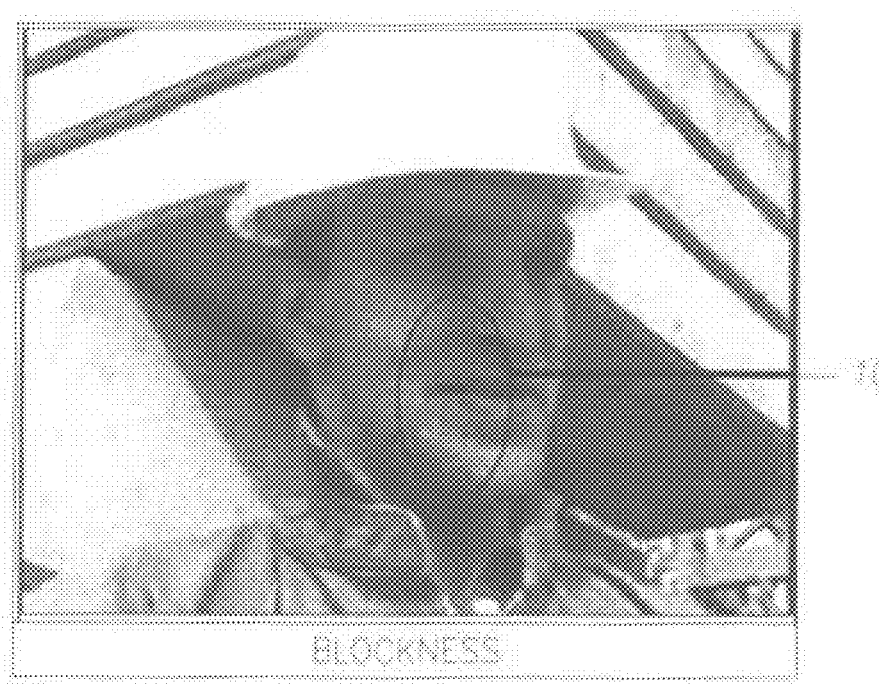
FIGS. 1A, 1B and 1C are exemplary decompressed images with exemplary types of distortions.
Figure 1B:
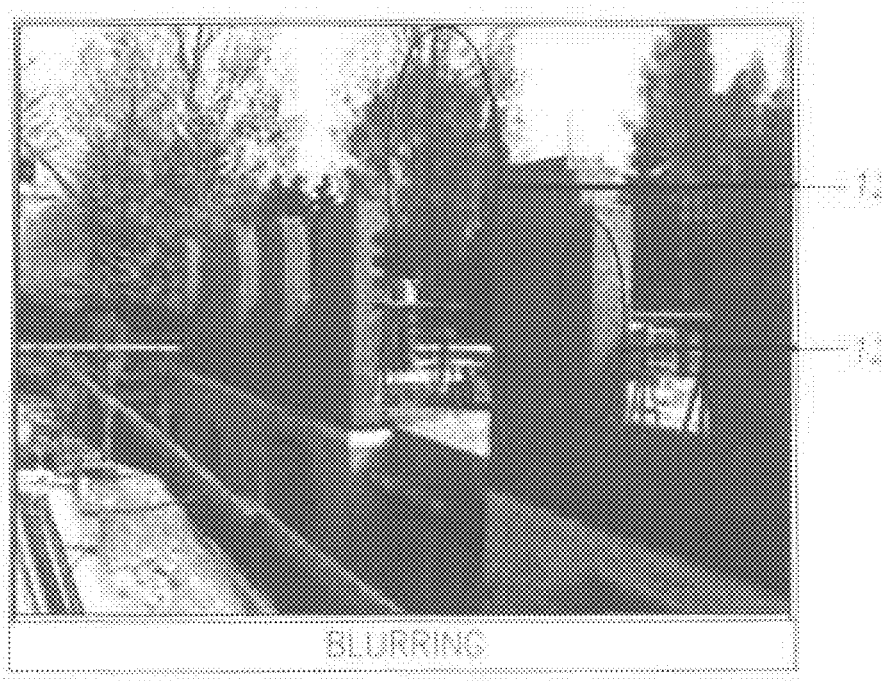
Figure 1C:
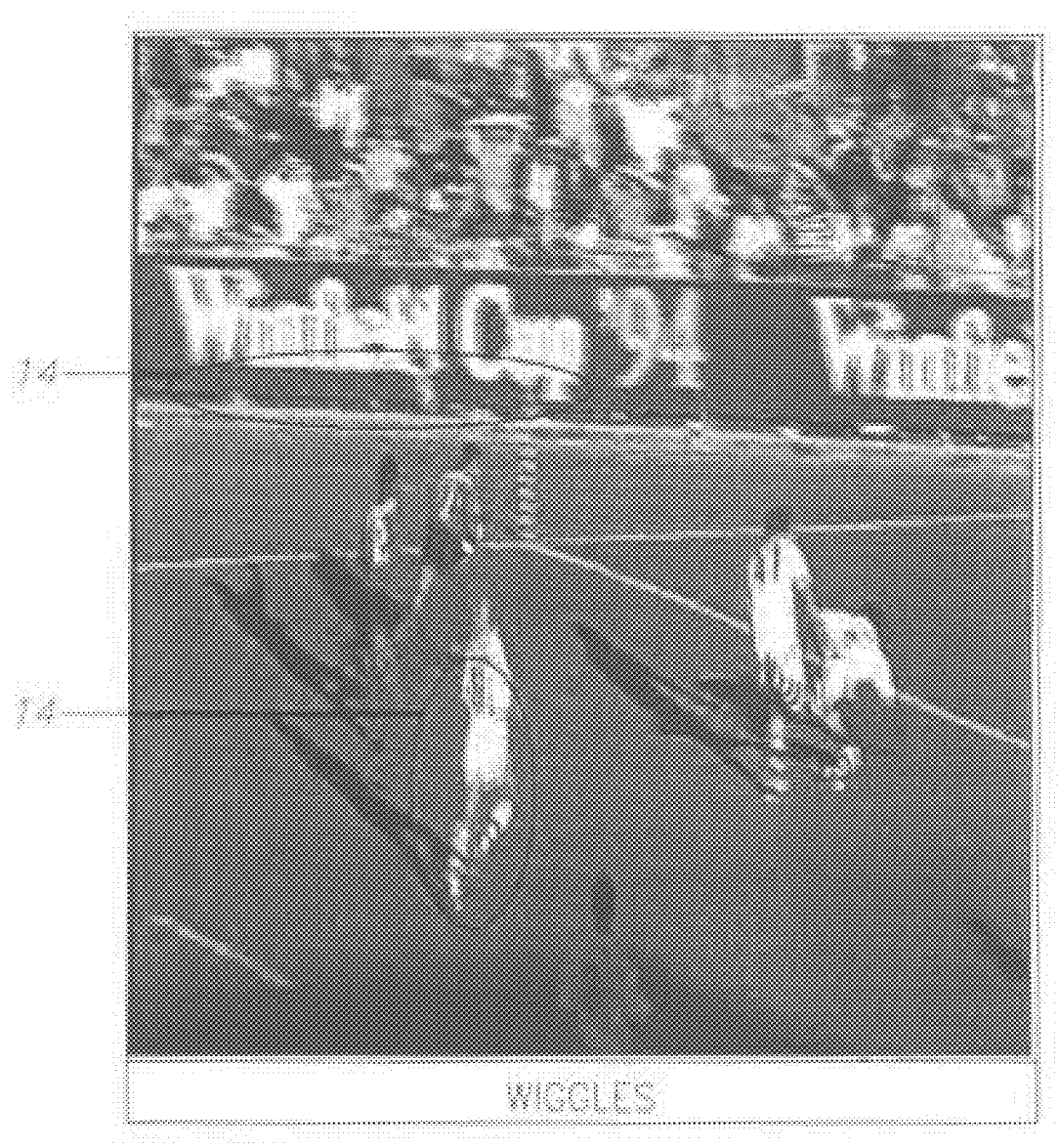

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the described embodiments. However, it will be understood by those skilled in the art that the described embodiments may be practiced without these specific details. In other instances, well-known methods, procedures, and components have not been described in detail so as not to obscure the described embodiments.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Figure 2:
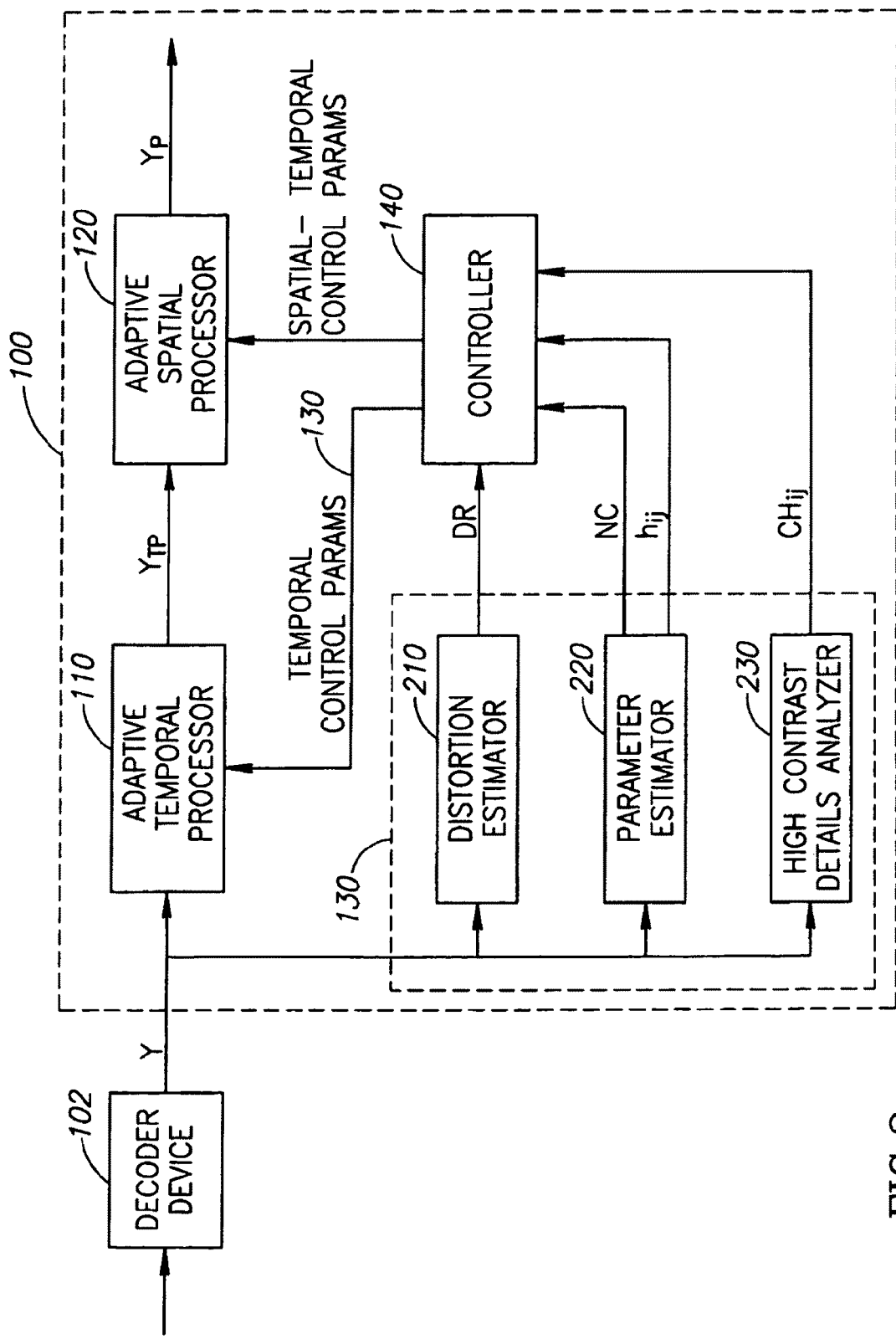
FIG. 2 is a block diagram illustration of an apparatus for improved picture quality, constructed and operative in accordance with one or more described embodiments.

Reference is now made to FIG. 2, which illustrates an exemplary and non-limiting block diagram of an apparatus 100 to improve the visual quality of images decompressed from compressed video signals, constructed and operative in accordance with one or more described embodiments. Apparatus 100 may operate in conjunction with various decoder devices 102, such as those installed in set-top boxes, satellite receivers, TV broadcast channel servers, digital still cameras, DVD players and recorders, large screen TV sets, media players, and the like, and may attempt to remove distortions and ringing effects found in the decompressed video signal, labeled Y, produced by such decoder devices 102.

Decompressed video signal Y may be decompressed from a signal encoded with coding techniques including, but not limited to, those of joint photographic expert group (JPEG), moving picture expert group (MPEG), such the MPEG-1, MPEG-2, and MPEG-4, h-compression, such as H.261, H.262, H.263 and H.264, Windows Media (WM) 9, and others. Such coding techniques typically represent the video signals with motion vectors and residual transform DCT coefficients. Each frame of the video signal is coded based on a prediction from one or more previously coded frames, and thus, properly decoding one frame requires first decoding one or more other frames. This temporal dependence between frames severely complicates a number of spatial and temporal processing techniques, such as translation, downscaling, and splicing.

Apparatus 100 may comprise an adaptive temporal processor 110, an adaptive spatial processor 120, an estimation unit 130, and a controller 140. As described in more detail herein below, estimation unit 130 may receive decompressed video signal Y and may analyze it to determine the extent of improvement necessary. Estimation unit 130 may include a distortion estimator 210, a parameter estimator 220, and a high contrast details analyzer 230. Distortion estimator 210 may estimate the amount of distortion DR by checking each block (e.g., 8×8-pixel) in an image.

Parameter estimator 220 may estimate the image complexity and may generate a value NC indicating the extent to which the image has changed from a previous image. The more complex an image, the more distorted the image may appear to the human eye. Parameter estimator 220 may also generate an $h_{ij}$ value indicating a change in intensity between a pixel (i,j) in two consecutive frames.

High contrast details analyzer 230 may analyze high contrast details in the image, such as edges and characters. High contrast details analyzer 230 may generate a per-pixel value $CH_{ij}$ indicating the extent of high contrast details at each pixel in the frame.

Controller 140 may convert the parameters generated by estimation unit 130 into temporal control parameters, which may control aspects of the processing of adaptive temporal processor 110, and spatial-temporal control parameters, useful for controlling adaptive spatial processor 120.

Adaptive temporal processor 110 may operate on decompressed signal Y, while adaptive spatial processor 120 may operate on the output, a signal $Y_{TP}$, of processor 110. The result may be an improved decompressed signal $Y_P$. Processors 110 and 120 may include temporal and spatial components such as are known in the art. In addition, processors 110 and 120 may include additional components controlled by the spatial and temporal control parameters received from controller 140. The latter may attempt to reduce the distortions and other low quality effects found in decompressed video signals. The output of adaptive spatial processor 120, the signal $Y_P$, may be an improved video signal with reduced distortions.

Figure 3:
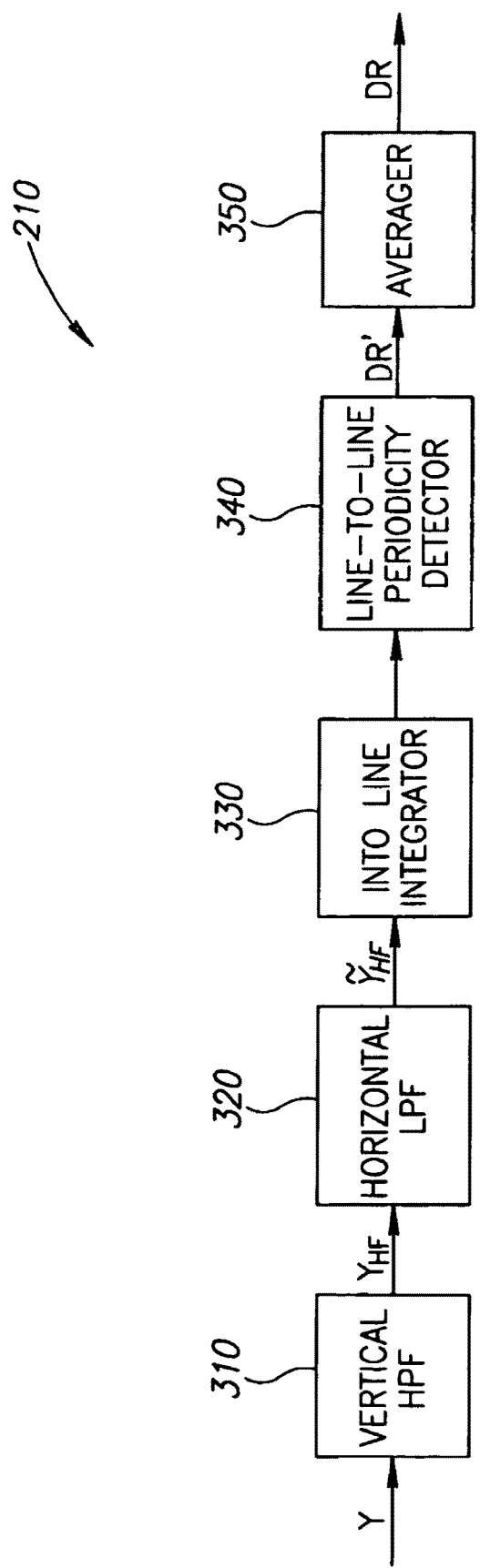
FIG. 3 is a block diagram illustration of an exemplary distortion estimator, forming part of the apparatus of FIG. 2.

Reference is now made to FIG. 3, which shows a non-limiting block diagram of distortion estimator 210 operative in accordance with an example embodiment. Distortion estimator 210 may include a vertical high pass filter (HPF) 310, a horizontal low pass filter (LPF) 320, an into line integrator 330, a line-to-line periodicity detector 340, and an averager 350.

Distortion estimator 210 may measure the blockness in the frame by counting the high frequency components along the edges of each k by k pixel block of the frame. To do so, vertical HPF 310 may transfer only the high frequency components $Y_{HF}$ of decompressed signal Y. Horizontal LPF 320 may reduce noise in the high frequency component signal $Y_{HF}$, generating thereby a signal $\tilde{Y}_{HF}$. Into line integrator 330 may sum, for each line in the frame, the number of $\tilde{Y}_{HF}$ components every $k^{th}$ pixel in the line. Line-to-line periodicity detector 340 may sum the number of high frequency components in each $k^{th}$ line and may generate the result, a value DR', as described in detail hereinbelow. The value DR' may indicate the amount of distortion in the current frame. Averager 350 may generate the distortion value DR by averaging DR' with the distortion value DR computed for the previous frames.

Figure 4:
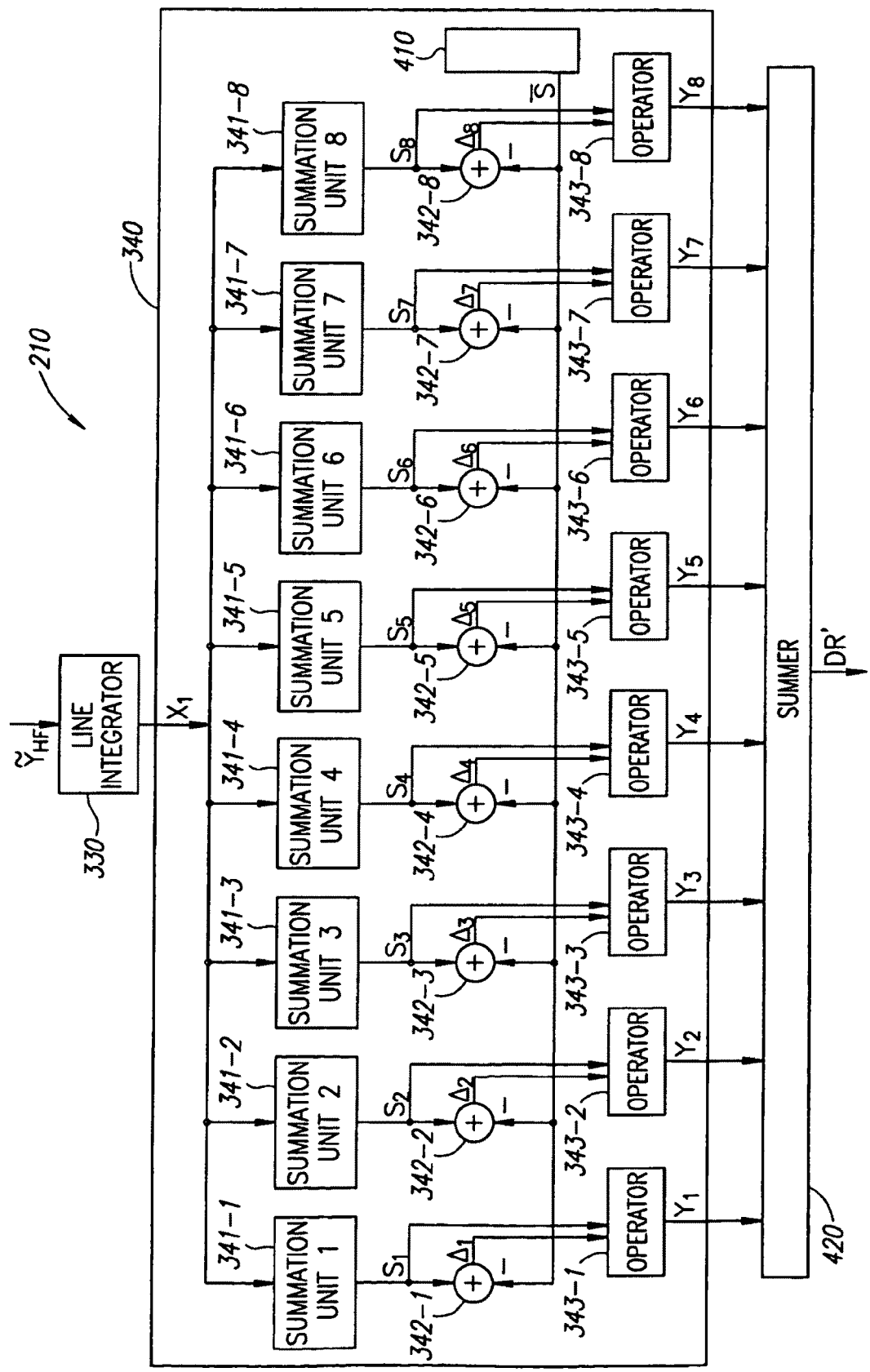
FIG. 4 is a detailed block diagram illustration of the distortion estimator of FIG. 3.

FIG. 4, to which reference is now made, shows an exemplary functional block diagram of line integrator 330 and line-to-line detector 340 for a block size of 8 by 8 pixels. While a block size of 8 by 8 pixels is illustrated and described in this example, it is to be appreciated and understood that other block sizes are possible without departing from the spirit and scope of the claimed subject matter.

Into line integrator 330 may sum the high frequency components $\tilde{Y}_{HF}$ of every $8^{th}$ pixel along a line/of the frame. The summation may be performed using the following equation:

$$X_l = \sum_{i=0}^{\frac{N-1}{8}} \tilde{Y}_{HF}(8i) \qquad (1)$$

where N is the number of pixels in a line.

To find column edges, line-to-line periodicity detector 340 may sum the output of line integrator 330 every $8^{th}$ line, starting at different lines. Detector 340 may then sum those blocks which are distorted, defined here as those outputs above an average value.

Detector 340 may include eight summation units 341-1 through 341-8, eight adders 342-1 through 342-8, eight operators 343-1 through 343-8, an averager 410 and a summer 420. Each summation unit 341-i may accumulate the high frequency components of each $8^{th}$ line starting from the $i^{th}$ line. For example, summation unit 341-1 may operate on lines 1, 9, 17, ... M−1, while summation unit 341-2 may operate on lines 2, 10, 18, ..., M−1, and so on. Mathematically, the $i^{th}$ summation unit 341-$i$ may operate as follows:

$$S_i = \sum_{j=0}^{\frac{M-1}{8}} X_l(i+8j) \quad (2)$$

where M is the maximum number of lines in a frame (e.g. M=480 for NTSC). The index i varies from 1 to 8.

Adders 342-$i$ and operators 343-$i$ together may operate to provide the value $S_i$ only if it is above an average value $\overline{S}$ of the set of values $S_i$, where average value $\overline{S}$ may be computed by average 410 as follows:

$$\overline{S} = \frac{\sum_{i=1}^{8} S_i}{8} \quad (3)$$

Each adder 342-$i$ may subtract average value $\overline{S}$ from its associated $S_i$ and may produce a different value $\Delta_i$.

An operator 343-$i$ may utilize its associated difference value $\Delta_i$ to generate a signal $y_i$ which has the value of $S_i$ only if difference value $\Delta_i$ is positive, as follows:

$$y_i = \begin{cases} 0 & \text{if } \Delta_i \leq 0 \\ S_i & \text{if } \Delta_i > 0 \end{cases} \quad (4)$$

The values $y_i$ may indicate the extent of distortion for each $i^{th}$ portion of the frame. Summer 420 may accumulate the values of $y_i$ to generate distortion level DR' for the current frame.

Figure 5:
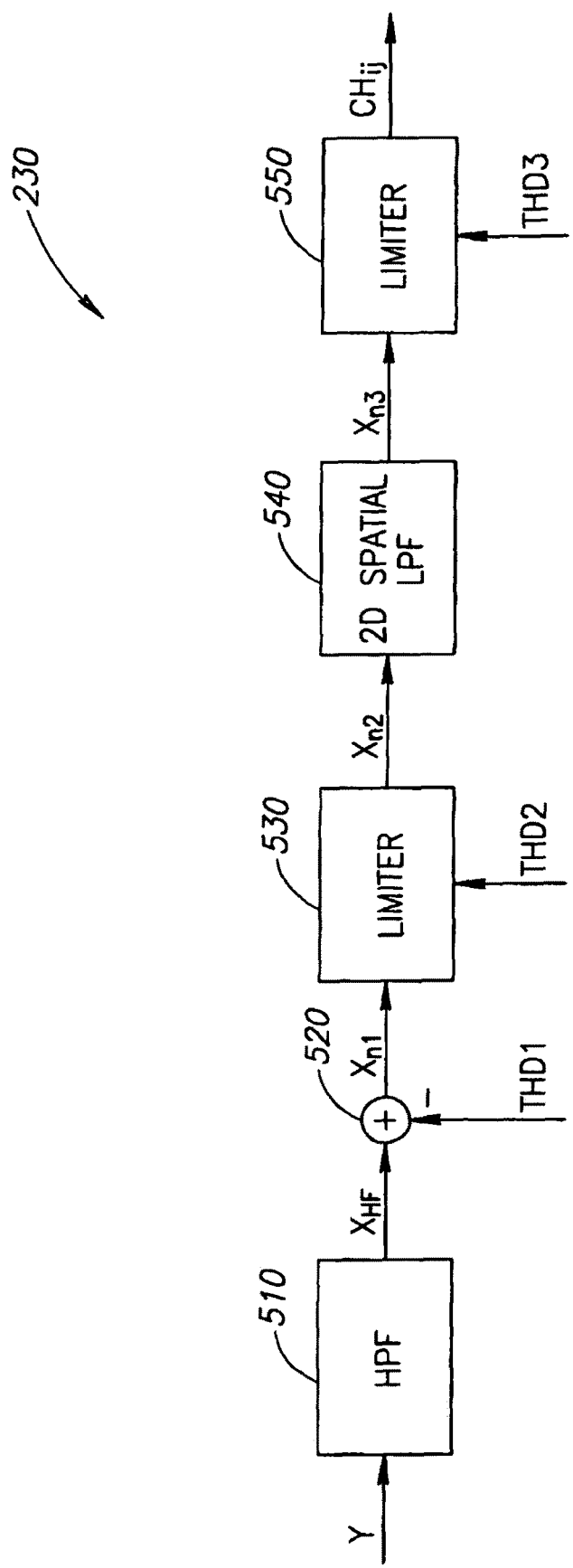
FIG. 5 is a block diagram illustration of an exemplary high contrast details analyzer forming part of the apparatus of FIG. 2.

Reference is now made to FIG. 5, which illustrates a non-limiting and exemplary block diagram of high contrast details analyzer 230. High contrast objects in video signals (e.g., text characters) may be characterized by high frequency components. In accordance with at least one described embodiment, they may be processed as distortions. To detect high contrast details, high contrast details analyzer 230 may comprise a high pass filter (HPF) 510, an adder 520, a limiter 530, a two-dimensional low-pass filter (LPF) 540 and a second limiter 550.

HPF 510 may generate high frequency components $X_{HF}$ from input decompressed video signal Y. Adder 520 may subtract a first threshold THD1 from the $X_{HF}$ components, thereby producing a shifted signal $X_{n1}$. THD1 may be defined by the expected intensity levels of high contrast details. For example, THD1 may be set to THD1=0.25$Y_{max}$, where $Y_{max}$ may be the maximum possible intensity level for the video signal (e.g., 256).

Limiter 530 may limit the signal intensities of the output of adder 520 (a signal $X_{n2}$) to those below a given threshold THD2, where THD2 may be set, for example, to THD2=0.1 $Y_{max}$. Specifically, the signal $X_{n2}$ output by limiter 530 may be written mathematically as follows:

$$X_{n2} = \begin{cases} 0 & \text{if } X_{n1} \leq 0 \\ X_{n1} & \text{if } 0 < X_{n1} \leq THD2 \\ THD2 & \text{if } X_{n1} > THD2 \end{cases} \quad (5)$$

2D-LPF 540 may filter the signal $X_{n2}$ to detect points (dots) in decompressed frame Y. LPF 540 may have a cutoff point which may be a function of both an expected contrast level and the size of the smallest details.

To indicate the presence of text characters in decompressed frame Y, limiter 550 may limit the intensities of signal $X_{n3}$, generated by LPF 540, to those below a given threshold THD3, where THD3 may be set to THD3=0.03$Y_{max}$, thereby generating a per-pixel $CH_{ij}$ signal. The level of per-pixel signal $CH_{ij}$ may be defined mathematically as follows:

$$CH_{i,j} = \begin{cases} 0 & \text{if } X_{n3} \leq 0 \\ X_{n3} & \text{if } 0 < X_{n3} \leq THD3 \\ THD3 & \text{if } X_{n3} > THD3 \end{cases} \quad (6)$$

Figure 6A:
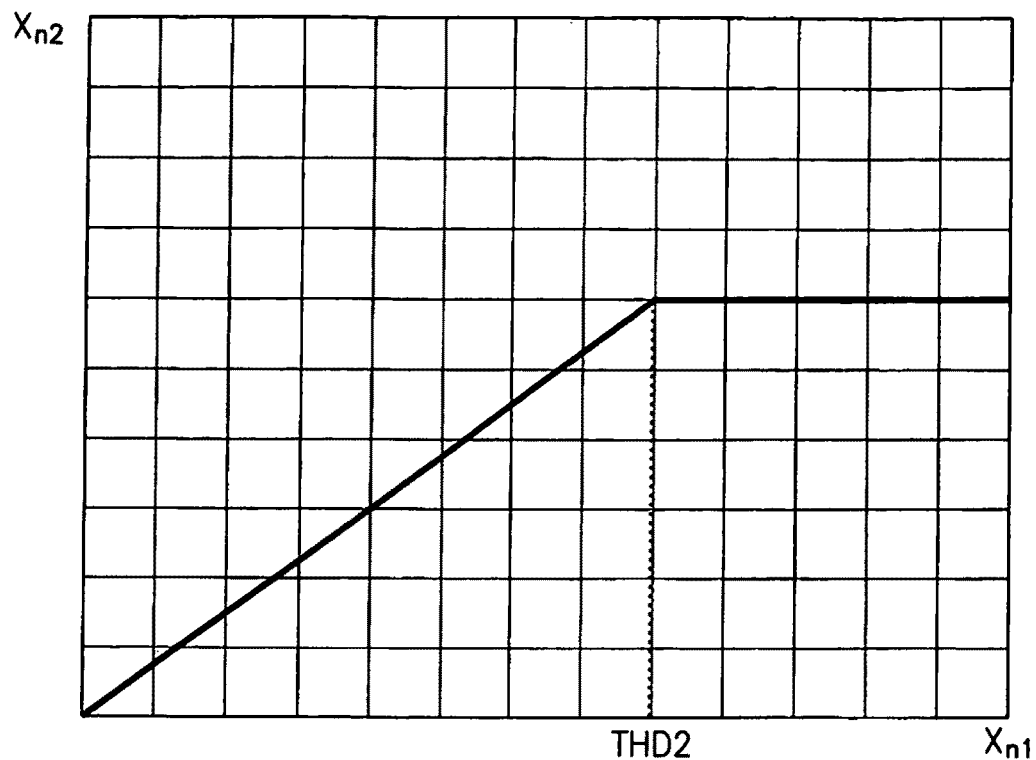
FIGS. 6A and 6B are graphical illustrations of the response of limiters, useful in understanding the operation of the high contrast details analyzer of FIG. 5.
Figure 6B:
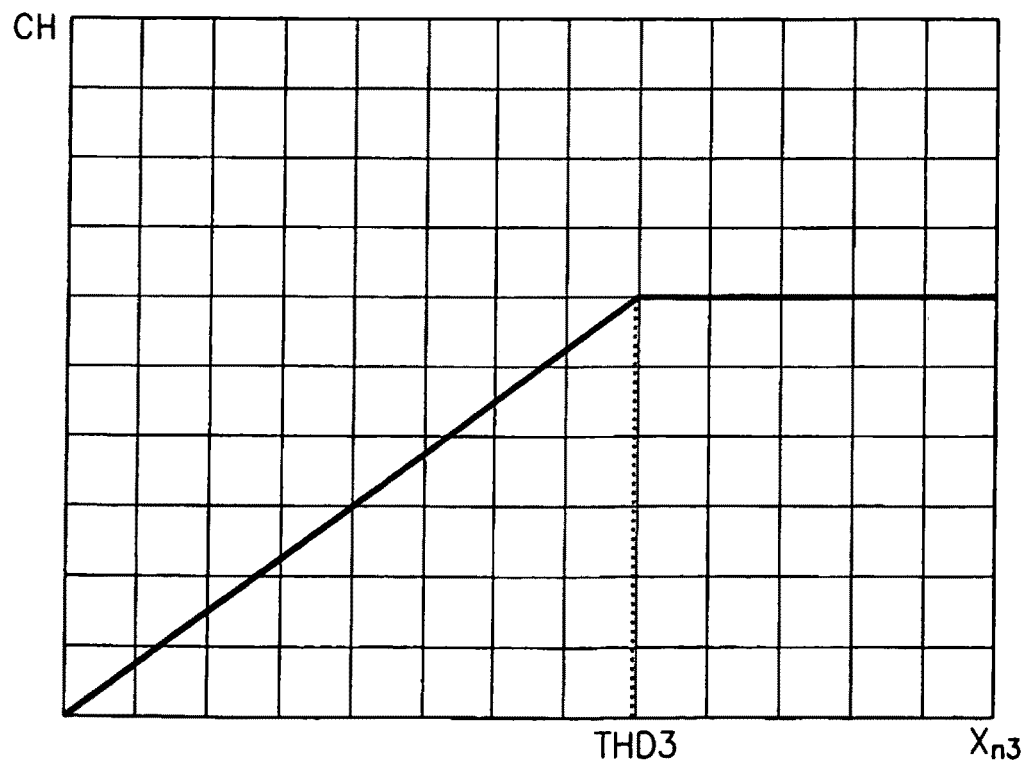

FIGS. 6A and 6B, to which reference is now briefly made, are graphical illustrations of the response of limiters 530 and 550 respectively.

Figure 7:
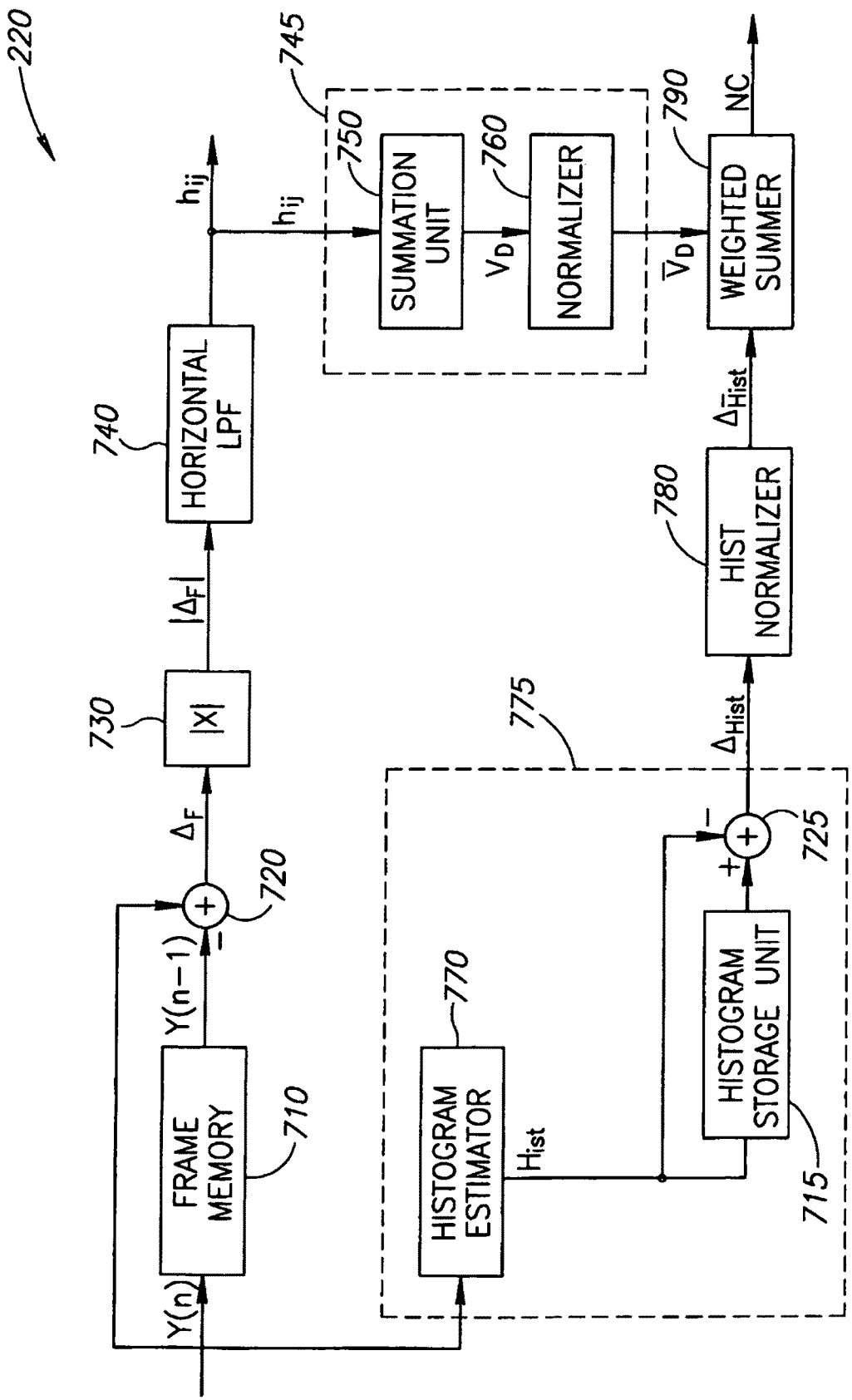
FIG. 7 is a block diagram illustration of an exemplary parameter estimator forming part of the apparatus of FIG. 2.

Reference is now made to FIG. 7, a non-limiting block diagram of parameter estimator 220, constructed and operative in accordance with an exemplary embodiment. As mentioned above, parameter estimator 220 may estimate the image complexity NC and may generate signal change values $h_{ij}$. Image complexity NC may indicate the extent to which the image has changed from a previous frame. The signal change values $h_{ij}$ may indicate, per pixel (i,j), the intensity change between two consecutive frames.

To generate the signal change values $h_{ij}$, parameter estimator 220 may take the difference of intensity between consecutive frames, for each pixel. For this purpose, parameter estimator 220 may comprise a frame memory 710 and an adder 720. Frame memory 710 may delay decompressed frame Y(n), thereby producing a previous frame Y(n−1). Adder 720 may generate a difference frame AF between previous frame Y(n−1) and current input frame Y(n).

Parameter estimator 220 may then smooth difference frame $\Delta_F$ with an absolute value operator 730 and a horizontal low pass filter (LPF) 740. Absolute value operator 730 may take the absolute value for each pixel in difference frame $\Delta_F$, generating a signal $|\Delta_F|$, and horizontal LPF 740 may generally reduce any noise that may be present in the signal $|\Delta_F|$. The intensity of each pixel (i, j) in signal $|\Delta_F|$ may be the value $h_{ij}$.

To generate image complexity NC, parameter estimator 220 may comprise a frame intensity change generator 745, which may utilize the pixel intensity changes $h_{ij}$, a histogram difference generator 775, a histogram normalizer 780 and a weighted summer 790.

Histogram difference generator 775 may determine how different a histogram of the intensities Y of the current frame (n) is from that of a previous frame (n−1). An image of the same scene generally may have a very similar collection of intensities, even if the objects in the scene have moved around, while an image of a different scene may have a different histogram of intensities. Thus, histogram difference estimator 775 may measure the extent of change in the histogram.

Histogram difference generator 775 may comprise a histogram estimator 770, a histogram storage unit 715 and an adder 725. Adder 725 may generate a difference histogram $\Delta_{Hist}$ by taking the difference between the histogram for the current frame (n) as provided by histogram estimator 770 and that of the previous frame stored in histogram storage unit 715.

Histogram normalizer 780 may normalize difference histogram $\Delta_{\overline{Hist}}$ as follows:

$$\Delta_{\overline{Hist}} = \frac{\Delta_{Hist}}{N*M} \quad (7a)$$

where N and M are the maximum number of lines and columns of the frame, respectively.

Frame intensity change generator 745 may determine an overall change value $\nabla_D$ indicating the extent of significant change in the frame and may comprise a summation unit 750 and a normalizer 760. Summation unit 750 may sum the values of $h_{ij}$ for all pixels in the in signal $|\Delta_F|$. Mathematically, summation unit 750 may perform the following equation:

$$V_D = \sum_{i=1}^{M}\sum_{j=1}^{N} h_{i,j} \quad (7b)$$

Normalizer 760 may normalize frame intensity change $\nabla_D$, by the frame size and the maximum intensity levels. For example, normalizer 760 may divide frame intensity change $\nabla_D$ by $M*N*Y_{max}$.

Weighted summer 790 may generate image complexity value NC from a weighted sum of normalized frame intensity change $\overline{\nabla}_D$ and normalized difference histogram $\Delta_{\overline{Hist}}$, as follows:

$$NC = K_H \Delta_{\overline{Hist}} + K_V \overline{V}_D \quad (7c)$$

where $K_H$ and $K_V$ are the weighting coefficients and each may have a value between 0 and 1.

Figure 8:
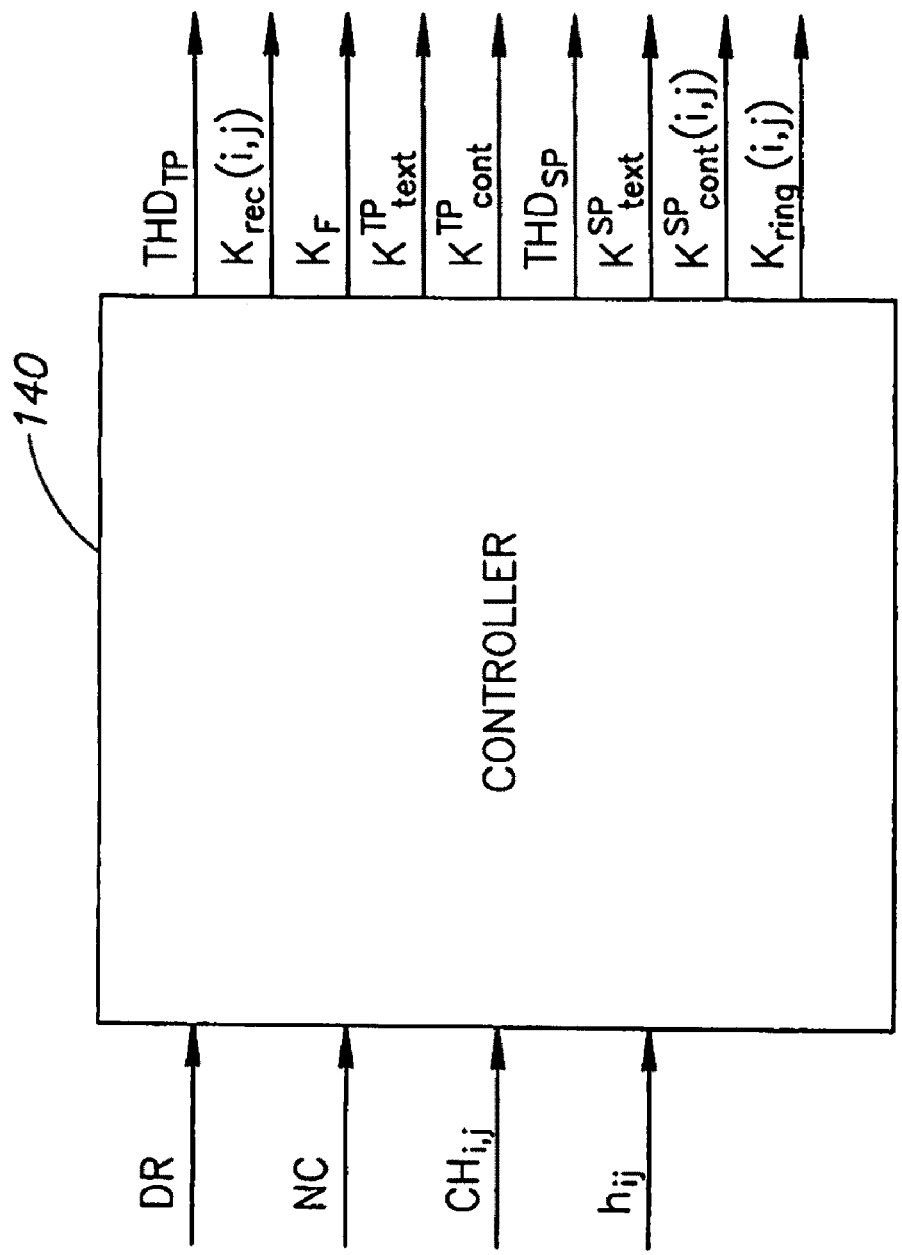
FIG. 8 is a block diagram illustration of a controller forming part of the apparatus of FIG. 2.

Reference is now made to FIG. 8, which illustrates controller 140 in accordance with an example embodiment. Controller 140 may generate temporal control parameters for adaptive temporal processor 110 and spatial-temporal control parameters for adaptive spatial processor 120 from the estimation and prediction parameters DR, $CH_{ij}$, $h_{ij}$ and NC discussed herein.

Controller 140 may generate a temporal threshold $THD_{TP}$ to define the level of low contrast small details in the frame. Typically, in low contrast images, the human eye can detect small details in an image only if their intensity levels are 3 times higher than the average noise (i.e., distortion). From this, the temporal threshold $THD_{TP}$ is defined, as follows:

$$THD_{TP} = 2\lfloor(1+DR*)+(1+NC)\rfloor \quad (8)$$

where DR* is a normalized value of DR, normalized by the quantity of blocks in a frame (e.g. N*M/8*8).

Controller 140 may generate a low-frequency coefficient $K_F$ which may be used to attenuate low frequency components to reduce blackness in the image.

$$K_F = 1 - 0.5 DR* \quad (9)$$

Controller 140 may generate a texture coefficient $K^{TP}_{text}$ and a contrast coefficient $K^{TP}_{cont}$ which may be used to reduce noise in high contrast and low contrast (i.e., texture) signals, respectively.

$$K_{text}^{TP} = 1 - DR* \quad (10)$$

$$K_{cont}^{TP} = 1 - DR* \quad (11)$$

Controller 140 may generate a spatial-temporal threshold $THD_{SP}$, to define the level of low contrast, small details in the frame and a spatial text coefficient $K^{SP}_{text}$ to adjust the texture sharpness in a video signal, as follows:

$$THD_{SP} = 3(1+DR*) \quad (12)$$

$$K_{text}^{SP} = K_{text.o}(1-DR*) \quad (13)$$

where $K_{text.o}$ is a maximum texture coefficient and may be equal or greater than 1.

Controller 140 may generate a per-pixel, spatial contrast coefficient $K^{SP}_{cont}(i,j)$ to adjust the sharpness of the small details, as follows:

$$K_{cont}^{SP}(i,j) = K_{cont.o}\lfloor 1 - 0.5(DR* - CH_{ij}*)\rfloor \quad (14)$$

where $K_{cont.o}$ is a maximum contrast coefficient and may be greater than 1 and $CH_{ij}*$ is a normalized value of per-pixel signal $CH_{max}$, normalized by $CH_{max}$, a maximum possible value of the $CH_{ij}$.

Controller 140 may generate a per-pixel recursion coefficient $K_{rec}(i,j)$ to reduce noise, as follows:

$$K_{rec}(i,j) = K_{rec.o}\lfloor 1 + 0.25(DR* + CH_{ij}*)\rfloor \quad (15)$$

where $K_{cont.o}$ is a maximum recursion coefficient and may be equal or smaller than 0.5.

As can be seen, the values of $K^{SP}_{text}$, $K_{rec}(i,j)$, and $K^{SP}_{cont}(i,j)$ depend on the amount of noise (CH) and distortion (DR) in the image. High values of these coefficients may imply high noise and distortion in the image.

Controller 140 may generate a ringing coefficient $K_{ring}(i,j)$ per pixel (i,j), to eliminate ringing effects, as follows:

$$K_{ring}(i,j) = 1 - 0.5 h_{ij}* \quad (16)$$

where $h_{ij}*$ is the normalized value of $h_{ij}$, normalized by $h_{ij\,max}$. The ringing coefficient $K_{ring}(i,j)$ may be used to reduce or eliminate ringing effects as will be described in greater detail hereinbelow.

Figure 9:
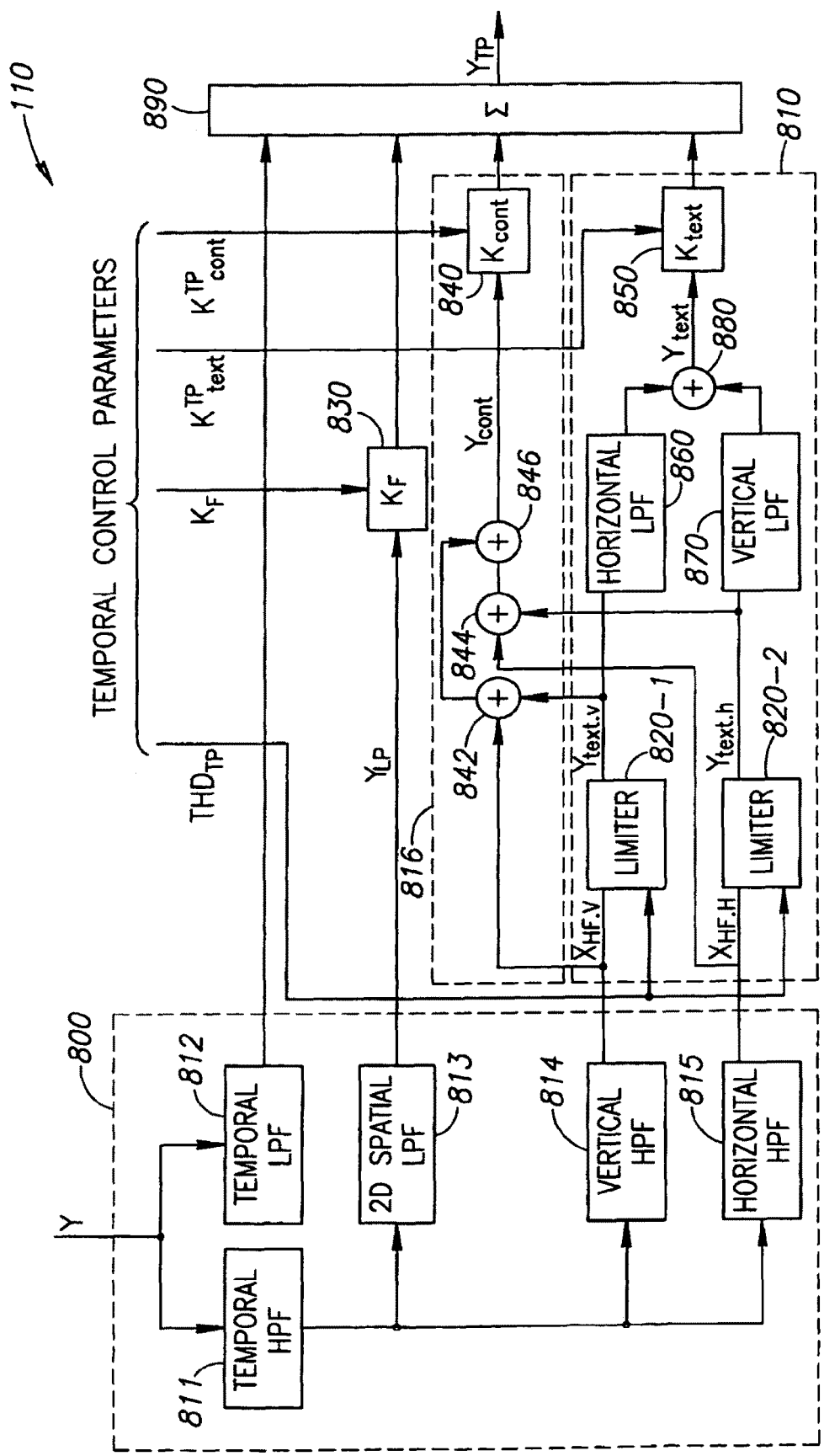
FIG. 9 is a block diagram illustration of an exemplary adaptive temporal processor forming part of the apparatus of FIG. 2.

Reference is now made to FIG. 9, which shows a non-limiting block diagram of adaptive temporal processor 110, constructed and operative in accordance with an example embodiment. Adaptive temporal processor 110 may comprise a standard temporal processor 800, a texture improver 810, a small details sharpener 816 and a blackness reducer 830.

Standard temporal processor 800 may comprise a temporal high pass filter (HPF) 811, a temporal low pass filter (LPF) 812, a two-dimensional (2D) spatial LPF 813, a vertical HPF 814, and a horizontal HPF 815 and may operate to temporally process decompressed frame Y.

Figure 12A:
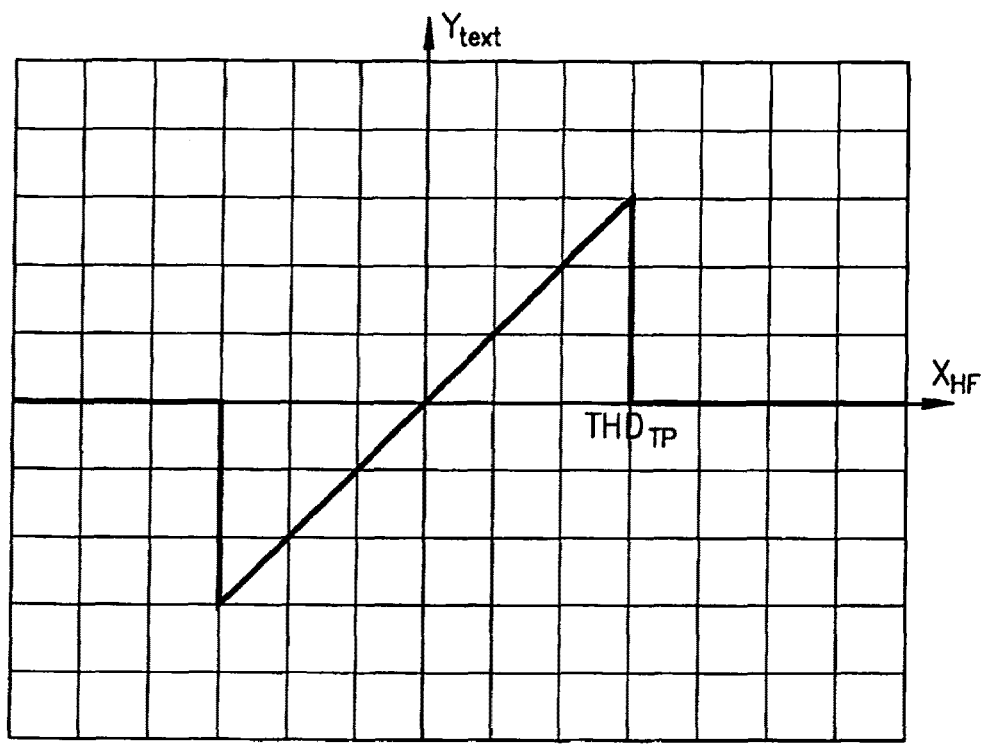
FIGS. 12A and 12B are graphical illustrations of the response of limiters, useful in understanding the operation of the processors of FIGS. 9 and 11.

Texture improver 810 may attempt to sharpen textual elements, if present, in decompressed frame Y and may comprise limiters 820-1 and 820-2, a horizontal LPF 860, a vertical LPF 870, a texture sharpener 850 and an adder 880. A graphical representation of both limiters 820-1 and 820-2 is provided in FIG. 12A.

Texture improver 810 may operate on the vertical and horizontal high frequency components (i.e. the components along a column and a row, respectively) of frame Y, generated by vertical HPF 814 and horizontal HPF 815, respectively. To sharpen text and other textured items and to reduce distortions without affecting the image quality, limiters 820 may limit the intensities of high frequency signals $X_{HF}$ to below $THD_{TP}$.

Low pass filters 860 and 870 may reduce noise from the output signals $Y_{text.v}$ and $Y_{text.h}$ of limiters 820-1 and 820-2, respectively. Specifically, low pass filter 860 may be a horizontal LPF operating on vertical signal $Y_{text,v}$ and, similarly, low pass filter 870 may be a vertical LPF operating on horizontal signal $Y_{text,h}$. It will be appreciated that such a structure may reduce noise without affecting the image sharpness. Experiments show that the expected noise reduction is around 6 dB.

Adder 880 may sum the thresholded and noise reduced signals to generate a texture signal $Y_{text}$ and texture sharpener 850 may adjust the sharpness of texture signal $Y_{text}$ with texture coefficient $K^{TP}_{text}$. It will be appreciated that sharpener 850 may reduce the texture sharpness with low values of $K^{TP}_{text}$ (present when the distortion level DR is high, as per equation 10) and may increase the sharpness for high values of $K^{TP}_{text}$. The values of $K^{TP}_{text}$ may be determined according to Eq. (10).

Small details sharpener 816 may comprise a contrast sharpener 840 and three adders 842, 844 and 846. Adders 842 and 844 may sum together the inputs and outputs of limiters 820, generating signals with strongly contrasting small details. Adder 846 may produce a linear sum of the outputs of adders 842 and 844 to generate a small details signal $Y_{cont}$. Contrast sharpener 840 may adjust the sharpness of the small details in $Y_{cont}$ using the contrast coefficient $K^{TP}_{cont}$ determined in accordance with Eq. (11). Contrast sharpener 840 may be a linear operator, i.e., it may reduce the small details sharpness with low values of $K^{TP}_{cont}$ and may increase the sharpness with high values of $K^{TP}_{cont}$.

Distortion reducer 830 may be a linear operator and may operate on the low pass filtered signals $Y_{LP}$ generated by 2D spatial LPF 813. Distortion reducer 830 may attenuate the low frequency components with coefficient $K_F$, in order to reduce blockness in the frame. The blockness coefficient $K_F$ may be determined in accordance with Eq. (9).

A summation unit 890 may accumulate the outputs of temporal low pass filter 812 (a noise reduced version of decompressed image Y), texture improver 810, small details sharpener 816 and distortion reducer 830 and may provide adaptive spatial processor 120 with signal $Y_{TP}$.

In accordance with an alternative embodiment, adaptive temporal processor 110 may comprise an adaptive recursive filter or infinite impulse response (IIR) filter. This may allow a reduction in the number of frame memories in the system.

Figure 10:
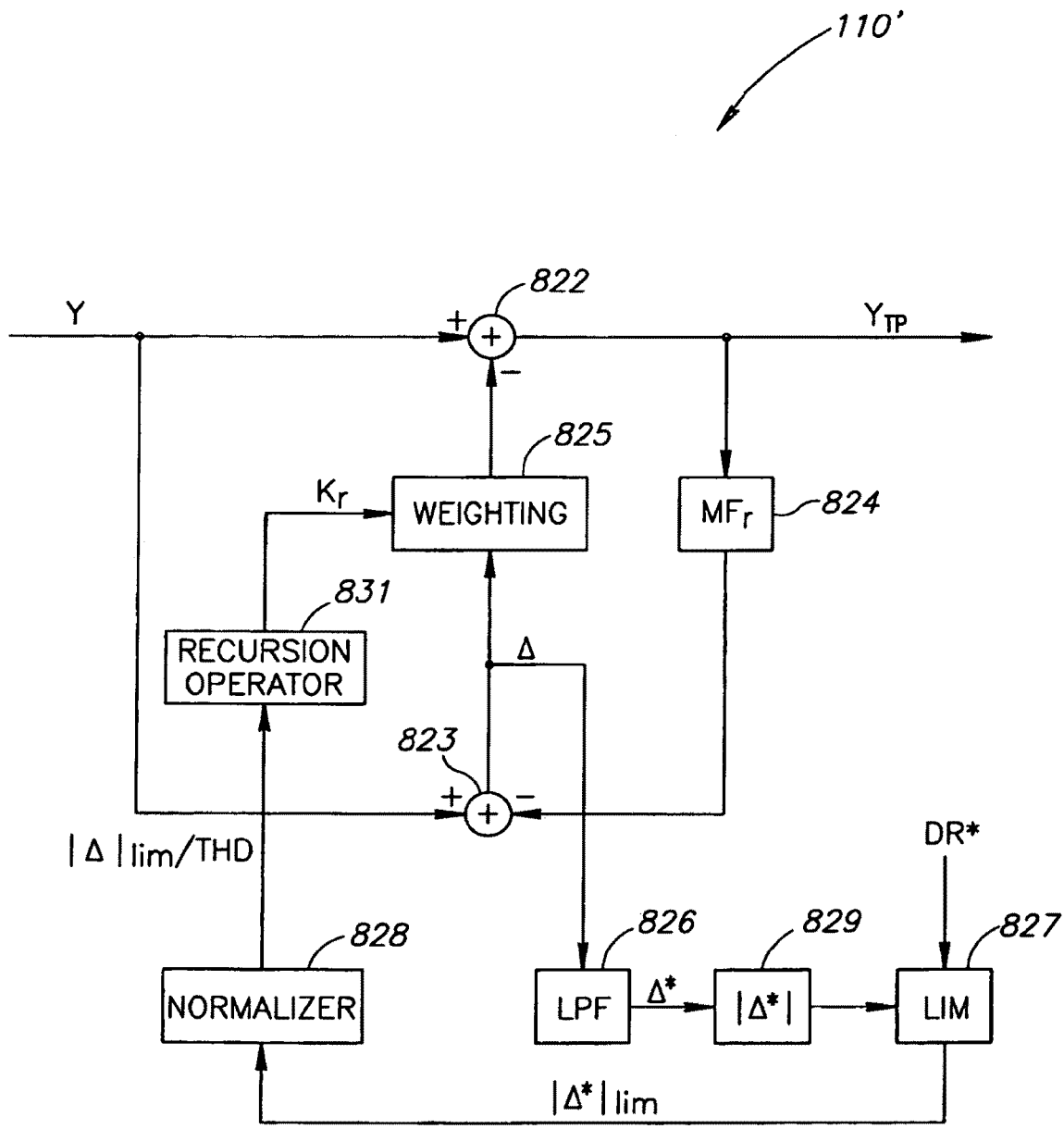
FIG. 10 is a block diagram illustration of an alternative embodiment of adaptive temporal processor, forming part of the apparatus of FIG. 2 and using an IIR filter.

A non-limiting block diagram of alternative adaptive temporal processor, labeled 110', is shown in FIG. 10. Processor 110 may have an adaptive recursion coefficient $K_r$ which may be changed according to the changes in intensity between the input Y and the processed output $Y_{TP}$ and as a function of the distortion level DR.

Processor 110' may comprise adders 822 and 823, a frame memory 824, a weighting unit 825, a low pass filter 826, limiters 827, a normalizer 828, an absolute value operator 829, and a recursion operator 831.

Adder 823 may generate a difference frame Δ between the previous output $Y_{TP}$, stored in frame memory 824 and current input frame Y.

Low pass filter LPF 826 may smooth difference frame Δ. and absolute value operator 829 may generate the absolute value |Δ*| of the output of low pass filter 826. Limiter 827 may limit the value |Δ*| below a threshold level THD, described hereinbelow, and generate a signal $|\Delta^*|_{lim}$. Normalizer 828 may then normalize the signal $|\Delta^*|_{lim}$ by THD, thereby producing a value between 0 and 1.

The THD level may be set to an average block signal value and may be computed as follows:

$$THD = THD_0 * (1 + pDR^*) \qquad (17)$$

where $THD_0 = 0.01 * Y_{max}$ and p may be equal to 2, 3, or 5.

Recursion operator 831 may generate adaptive recursion coefficient $K_r$ for the filter as follows:

$$K_r = K_{ro} * (1 - |\Delta|_{lim}/THD) \qquad (18)$$

where $K_{ro}$ may vary between 0 and 1.

Weighting unit 825 and adder 822 may implement the IIR filter by multiplying the difference frame Δ by adaptive recursion coefficient $K_r$ and subtracting the weighted result from input frame Y.

It will be appreciated by a person skilled in the art that for high probability blocks (i.e. blocks with low and mid contrast levels of blackness), $K_r$ is high and the noise and blockness reduction is relatively efficient.

Figure 11:
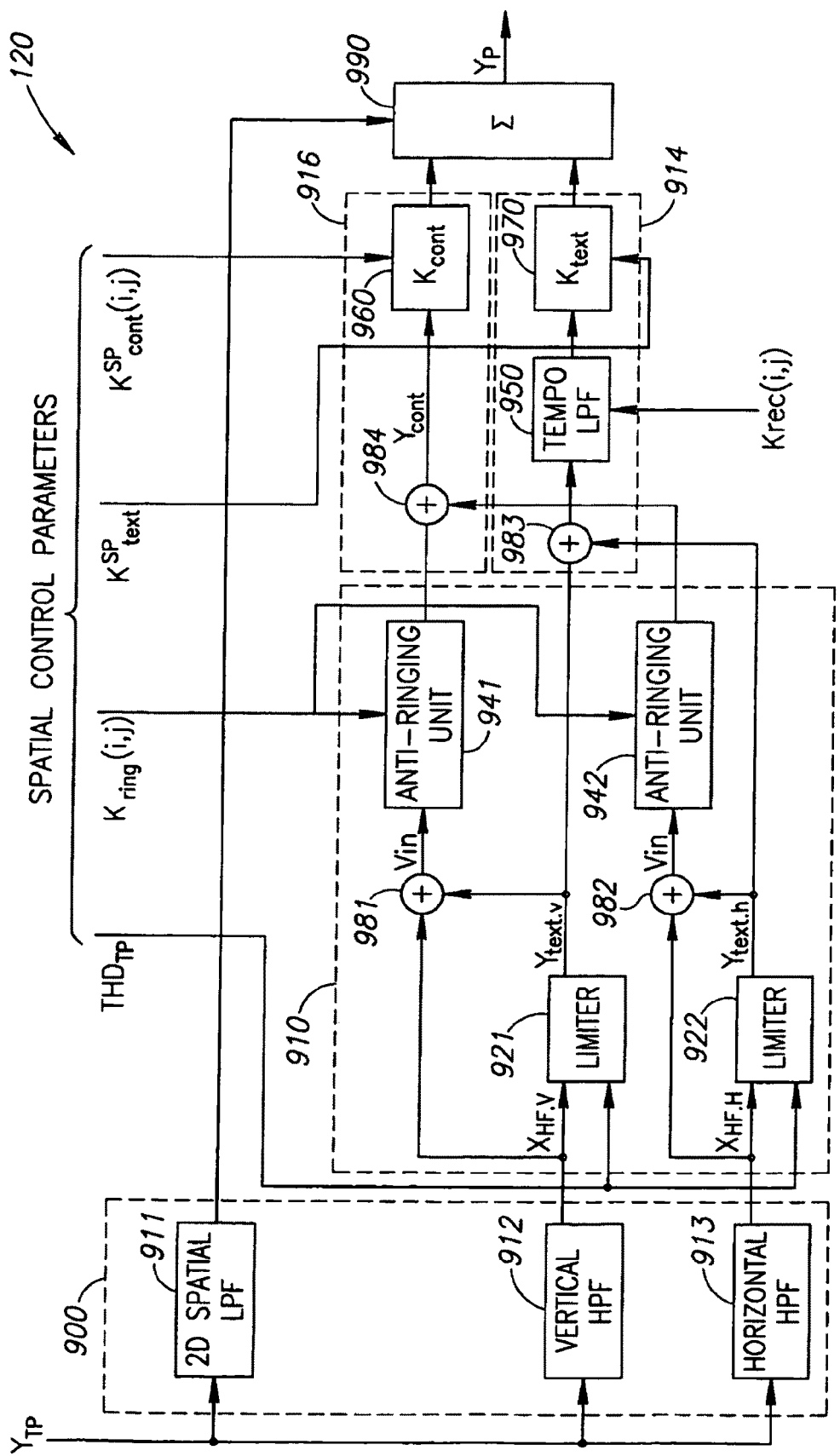
FIG. 11 is a block diagram illustration of an exemplary adaptive spatial processor forming part of the apparatus of FIG. 2.

Reference is now made to FIG. 11, which shows a non-limiting block diagram of adaptive spatial processor 120, constructed and operative in accordance with an example embodiment. Adaptive spatial processor 120 may comprise a standard spatial-temporal processor 900, a ringing eliminator 910, a texture improver 914 and a small details sharpener 916.

Spatial-temporal processor 900 may perform spatial processing on signal $Y_{TP}$ provided by processor 110 or processor 110'. Spatial-temporal processor 900 may comprise a two-dimensional (2D) spatial low pass filter (LPF) 911, a vertical high pass filter (HPF) 912, and a horizontal low pass filter (LPF) 913.

Ringing eliminator 910 may attempt to remove ringing effects in the decompressed video signal. A ringing effect (or corona effect) may appear around the edge of the decompressed block and may cause noise in the high frequency component of the decoded video signal. The ringing effect may induce annoying visual artifacts that are especially noticeable on large screen TVs.

Figure 12B:
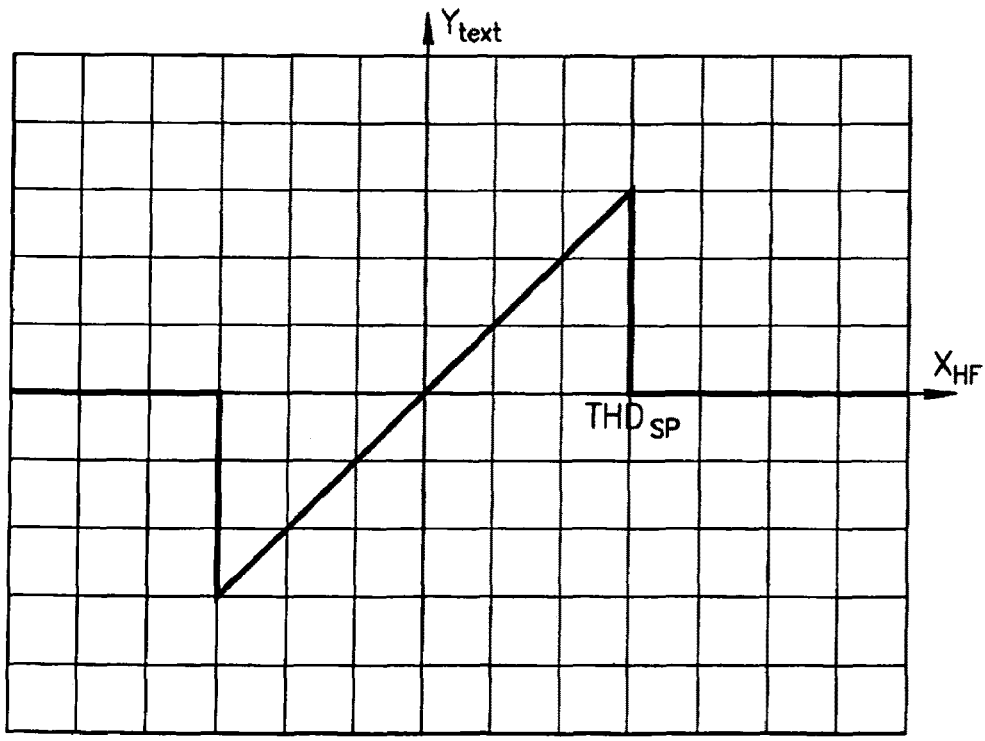

Ringing eliminator 910 may comprise limiters 921 and 922, anti-ringing units 941 and 942 as well as adders 981 and 982. A graphical representation of both limiters 921 and 922 is provided in FIG. 12B.

Ringing eliminator 910 may operate on the vertical and horizontal high frequency components of signal $Y_{TP}$, generated by vertical HPF 912 and horizontal HPF 913, respectively. To determine a texture level for horizontal and vertical components in signal $Y_{TP}$, limiters 921 and 922 may limit the intensities of high frequency signals $X_{HF,V}$ and $X_{HF,H}$, respectively, to below $THD_{SP}$. Adders 942 and 944 may sum together the inputs and outputs of limiters 921 and 922, respectively, generating signals, labeled $V_{in,V}$ and $V_{in,H}$, respectively, with strongly contrasting small details.

Figure 13:
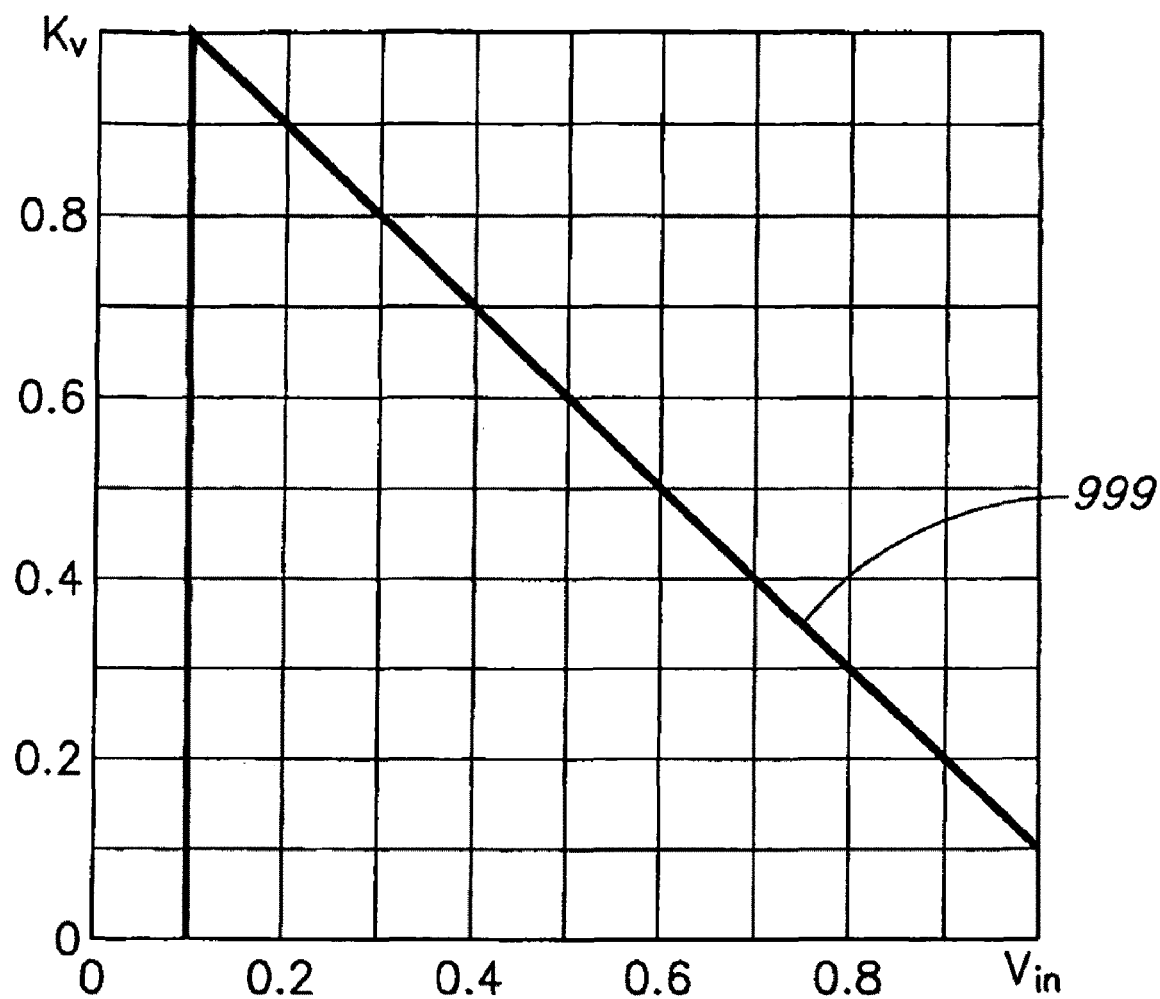
FIG. 13 is a graphical illustration of a $K_v$ function, useful in understanding the operation of the processor of FIG. 11.

Anti-ringing units 941 and 942 may receive the $V_{in}$ signals and may attenuate them, using an attenuation graph, such as that shown in FIG. 13, to which reference is now briefly made.

FIG. 13 graphs a fixed coefficient $K_v$ as a linear inverse function 999 of the input signal $V_{in}$. Anti-ringing units 941 and 942 may then weight fixed coefficient $K_v$ by per-pixel, ringing coefficient $K_{ring}(i,j)$ to generate an anti-ringing attenuation coefficient $K_{ar}$, as follows:

$$K_{ar} = K_{ring}(i,j) * K_v \qquad (19)$$

Texture improver 914 may attempt to sharpen textual elements, if present, in the outputs of limiters 921 and 922. Texture improver 914 may comprise an adder 983, a temporal LPF 950 and a texture sharpener 970. Adder 983 may generate a texture signal $Y_{text}$ and temporal LPF 950 may operate on textural signal $Y_{text}$ to reduce noise using per-pixel recursion coefficient $K_{rec}(i,j)$, which may be determined in accordance with Eq. (15). Temporal LPF 950 may be an infinite impulse response (IIR) filter and may utilize per-pixel recursion coefficient K$_{rec}$(i,j) as its recursion coefficient. It will be appreciated that recursion coefficient K$_{rec}$(i,j) may be a function of the distortion level and small details in the image. The level of noise reduction is higher for higher values of K$_{rec}$(i,j).

Texture sharpener 970 may be a linear operator and may adjust the texture sharpness of the output of temporal LPF 950 with the value of K$^{SP}_{text}$ determined in accordance with Eq. (13).

Small details sharpener 916 may comprise an adder 984 and a contrast sharpener 960. Adder 984 may sum the outputs of anti-ringing units 941 and 942, generating a signal, labeled Y$_{cont}$, with strongly contrasting, small details. Contrast sharpener 960 may adjust the sharpness of the small details based on the per-pixel values of K$^{SP}_{cont}$(i,j) determined in accordance with Eq. (14). Contrast sharpener 960 may be a linear operator, i.e., it may reduce the small details sharpness with low values of K$^{SP}_{cont}$(i,j) and may increase the sharpness with high values of K$^{SP}_{cont}$(i,j).

A summation unit 990 may accumulate the outputs of 2D spatial LPF 911, texture improver 914 and small details sharpener 916 to generate improved quality video signal Y$_p$.

It should be appreciated by a person skilled in the art that the components of apparatus 100 disclosed herein may be hardware components, software components, firmware components, or any combination thereof.

Figure 14:
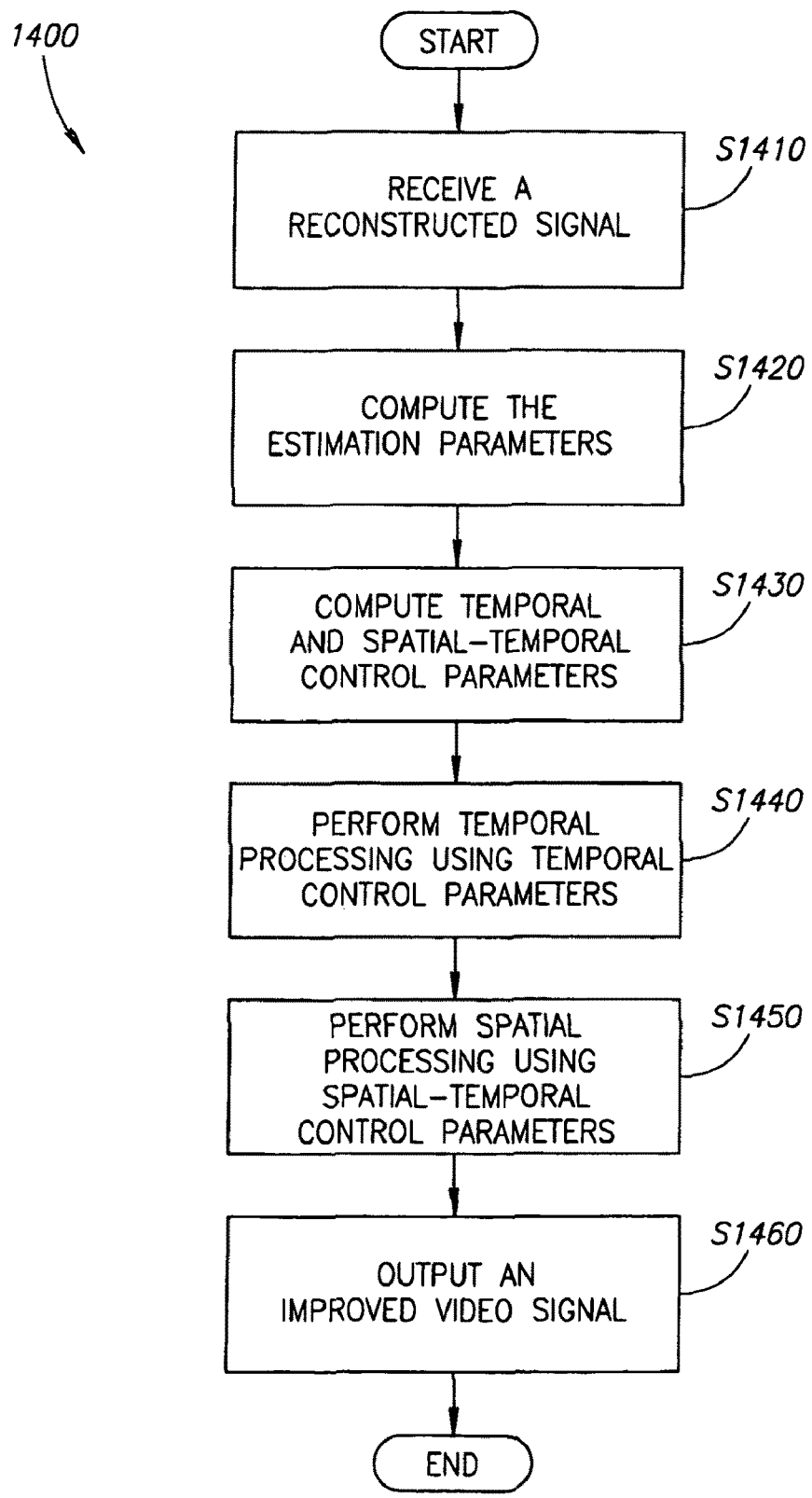
FIG. 14 is a flow chart illustration of a method of operating the apparatus of FIG. 2.

Reference is now made to FIG. 14, which shows a non-limiting flowchart 1400 describing the operation of apparatus 100 in accordance with an example embodiment. Apparatus 100 may perform the steps of FIG. 14 in order or in parallel.

At step S1410, apparatus 100 may receive decompressed signal Y. At step S1420, estimation unit 130 may estimate the amount of distortion DR, the image complexity NC, the intensity change value h$_{ij}$, and the extent of high contrast details CH, as described in greater detail above. At step S1430, controller 140 may generate the temporal and spatial-temporal control parameters according to the equations provided hereinabove.

Utilizing the temporal control parameters, at step S1440, adaptive temporal processor 110 may temporally process decompressed signal Y to eliminate temporal dependencies and to reduce noise and blockness. In addition, adaptive temporal processor 110 may adjust the texture sharpness and the small details sharpness. At step S1450, adaptive spatial processor 120 may spatially process the output of adaptive temporal processor 110. The spatial processing may involve reducing noise and ringing effects as well as adjusting the sharpness of small details and texture components. Adaptive spatial processor 120 may utilize the spatial-temporal control parameters. At step S1460, adaptive spatial processor 120 may output the signal Y$_p$ which has enhanced video quality.

While certain features have been illustrated and described herein, many modifications, substitutions, changes, and equivalents will now occur to those of ordinary skill in the art. It is, therefore, to be understood that the appended claims are intended to cover all such modifications and changes as fall within the spirit and scope of the subject matter described herein.

What is claimed is:

1. An apparatus comprising:
    an estimation unit configured to generate, from decompressed video frames, visual quality parameters that describe an image in a particular frame of the decompressed video frames, the estimation unit being configured to generate the visual quality parameters based on a check of a block of pixels that was decompressed from a transformed block included in a compressed version of the particular frame; and
    an enhancer unit configured to enhance the particular frame, using one or more of the visual quality parameters, to improve a visual quality of the image.

2. The apparatus of claim 1, wherein the visual quality comprises one or both of an extent of distortion or an extent of ringing effect.

3. The apparatus of claim 1, wherein the apparatus comprises a media player device.

4. The apparatus of claim 1, wherein the apparatus comprises at least one of:
    a set-top box;
    a satellite receiver;
    a television (TV) broadcast channel server;
    a TV set;
    a digital still camera;
    a digital videodisc (DVD) recorder; or
    a DVD player.

5. The apparatus of claim 1, wherein the apparatus is configured to decompress frames from a signal encoded according to at least one of:
    a joint photographic expert group (JPEG) technique;
    a moving picture expert group (MPEG) technique;
    an H-compression technique; or
    a Windows Media (WM) technique.

6. The apparatus of claim 1, wherein the estimation unit is further configured to generate the visual quality parameters based on a prediction determined from one or more other frames included in the decompressed video frames.

7. The apparatus of claim 1, wherein the visual quality parameters are based on a value that indicates a change in intensity for a particular pixel within the block of pixels between two consecutive frames in the decompressed video frames.

8. The apparatus of claim 1, wherein the check comprises counting high frequency components along edges of the block of pixels.

9. The apparatus of claim 1, wherein the transformed block comprises a compressed version of a block of pixels included in the particular frame.

10. The apparatus of claim 1, wherein the transformed block comprises an eight-by-eight (8×8) block of pixels included in the particular frame.

11. The apparatus of claim 1, wherein the visual quality parameters indicate an extent of a visual defect associated with decompression of the compressed version of the particular frame.

12. A computer-implemented method comprising:
    estimating, based on decompressed video frames, visual quality parameters that indicate a visual quality of an image in a particular frame of the decompressed video frames on a per frame basis, the visual quality parameters being estimated based on a check of blocks of pixels in the image that were decompressed from transformed blocks included in a compressed version of the particular frame; and
    improving the visual quality of the image using one or more of the visual quality parameters.

13. The method of claim 12, wherein the visual quality comprises one or both of an extent of distortion or an extent of ringing effect.

14. The method of claim 12, wherein estimating and improving are performed by a media player device.

15. The method of claim 12, wherein estimating and improving are performed by at least one of:
    a set-top box;
    a satellite receiver;
    a television (TV) broadcast channel server;

a TV set;
a digital still camera;
a digital videodisc (DVD) recorder; or
a DVD player.

16. The method of claim 12, further comprising decompressing a video signal to provide the decompressed video frames, wherein the video signal is encoded according to at least one of:
a joint photographic expert group (JPEG) technique;
a moving picture expert group (MPEG) technique;
an H-compression technique; or
a Windows Media (WM) technique.

17. The method of claim 12, wherein the visual quality parameters are based on a value that indicates the image's complexity.

18. The method of claim 12, wherein the transformed block comprises a compressed version of a block of pixels included in the particular frame.

19. The method of claim 12, wherein the transformed block comprises a compressed version of an eight-by-eight (8×8) block of pixels included in the particular frame.

20. The method of claim 12, wherein the visual quality parameters indicate an extent of a visual defect associated with decompression of the compressed version of the particular frame.

21. One or more computer-readable storage memories having instructions stored thereon that, responsive to being executed by one or more components of a video processing system, cause the one or more components to perform operations comprising:
estimating visual quality parameters for an image, based on a check of individual blocks of pixels obtained from transformed blocks of compressed video frames, that indicate a visual quality of the image in decompressed video frames obtained from the compressed video frames;
improving the visual quality of the image using one or more of the visual quality parameters.

22. One or more computer-readable storage memories of claim 21, wherein estimating the visual quality comprises estimating one or both of an extent of distortion or an extent of ringing effect.

23. One or more computer-readable storage memories of claim 21, wherein the estimating and improving are performed by a media player device.

24. One or more computer-readable storage memories of claim 21, wherein the estimating and improving are performed by at least one of:
a set-top box;
a satellite receiver;
a television (TV) broadcast channel server;
a TV set;
a digital still camera;
a digital videodisc (DVD) recorder; or
a DVD player.

25. One or more computer-readable storage memories of claim 21, further comprising instructions that, responsive to being executed by the one or more components of the video processing system, cause the one or more components to perform operations including:
decompressing a video signal to provide the decompressed video frames, wherein the video signal is encoded according to at least one of:
a joint photographic expert group (JPEG) technique;
a moving picture expert group (MPEG) technique;
an H-compression technique; or
a Windows Media (WM) technique.

26. The tangible computer-readable storage medium of claim 21, wherein the visual quality parameters further comprise a value that indicates a change in intensity for a pixel, in the image, as represented between two consecutive decompressed video frames, and a value that indicates an extent of high contrast details in a pixel included in the image.

27. A system comprising:
means for decompressing video frames of a video signal;
means for generating, from decompressed video frames, visual quality parameters that describe a distortion estimate for an image in a particular frame of the decompressed video frames, the distortion estimate being determined based on a block-by-block check of blocks of pixels in the particular frame that are obtained from transformed blocks included in a compressed version of the particular frame; and
means for improving a visual quality of the image using on one or more of the visual quality parameters.

28. The system of claim 27, wherein the video signal is encoded according to at least one of:
a joint photographic expert group (JPEG) technique;
a moving picture expert group (MPEG) technique;
an H-compression technique; or
a Windows Media (WM) technique.

29. The system of claim 27, wherein the visual quality comprises one or both of an extent of distortion or an extent of ringing effect.

30. The system of claim 29, wherein the extent of distortion and the extent of ringing effect are due to one or more of compression or decompression of the particular frame.

31. The system of claim 27, wherein the system comprises a media player device.

32. The system of claim 27, wherein the system comprises at least one of:
a set-top box;
a satellite receiver;
a television (TV) broadcast channel server;
a TV set;
a digital still camera;
a digital videodisc (DVD) recorder; or
a DVD player.

33. One or more computer-readable storage memories of claim 21, wherein estimating the visual quality parameters further comprises estimating a value that indicates a change in intensity for a pixel in the image between two consecutive frames of the decompressed video and a value that indicates an extent of high contrast details in a pixel included in the image.

34. The system of claim 27, wherein the distortion estimate comprises an estimate of a distortion in the particular frame due to one or more of compression or decompression of the particular frame.

35. The system of claim 27, wherein the transformed blocks respectively comprise compressed versions of eight-by-eight (8×8) blocks of pixels included a video frame of the video signal.

36. An apparatus comprising:
an estimation unit configured to generate, from decompressed video frames, visual quality parameters that describe the decompressed video frames, the estimation unit comprising:
a distortion estimator configured to estimate one or more video frame distortion levels that are obtained from a check of respective blocks of pixels in a frame included in the decompressed video frames, wherein respective said blocks of pixels comprise decompressed versions of transformed blocks included in a compressed version of the frame;

a parameter estimator configured to estimate one or more image complexity values and one or more a per-pixel intensity changes; and an analyzer configured to estimate one or more video frame high contrast small details levels.

37. The apparatus of claim 36, wherein the compressed version of the frame is compliant with at least one of:

a joint photographic expert group (JPEG) technique;
a moving picture expert group (MPEG) technique;
an H-compression technique; or
a Windows Media (WM) technique.

38. The apparatus of claim 36, further comprising:

a controller unit configured to convert the visual quality parameters to control parameters for controlling processing of the decompressed video frames; and an enhancer unit configured to improve a visual quality of an image in the decompressed video frames through use of the control parameters in processing the decompressed video frames.

39. The apparatus of claim 38, wherein the visual quality comprises one or both of an extent of distortion or ringing effect.

40. The apparatus of claim 38, wherein the enhancer unit comprises an adaptive temporal processor configured to process the decompressed video frames to provide adaptive temporal processor output that is usable as a basis to reduce distortion in the image in comparison to the image without the adaptive temporal processor output applied.

41. The apparatus of claim 40, wherein the enhancer unit further comprises an adaptive spatial processor configured to process the adaptive temporal processor output to provide adaptive spatial processor output.

42. The apparatus of claim 36, wherein the apparatus comprises a media playing device.

43. The apparatus of claim 36, wherein the apparatus comprises at least one of:

a set-top box;
a satellite receiver;
a television (TV) broadcast channel server;
a TV set;
a digital still camera;
a digital videodisc (DVD) recorder; or
a DVD player.

44. The apparatus of claim 36, wherein the visual quality parameters indicate an extent of a visual defect associated with decompression of the compressed version of the frame.

45. The apparatus of claim 36, wherein the transformed blocks respectively comprise compressed versions of eight-by-eight (8×8) blocks of pixels included in the frame.

* * * * *

UNITED STATES PATENT AND TRADEMARK OFFICE
CERTIFICATE OF CORRECTION

| | |
|---|---|
| PATENT NO. | : 7,805,019 B2 |
| APPLICATION NO. | : 12/316168 |
| DATED | : September 28, 2010 |
| INVENTOR(S) | : Semion Sheraizin et al. |

It is certified that error appears in the above-identified patent and that said Letters Patent is hereby corrected as shown below:

Title page 1, column 2, line 2, under "Other Publications", delete "video.tech nolo,qy," and insert -- video technology, --, therefor.

In column 14, lines 1-6, in Claim 26, delete "The tangible computer-readable storage medium of claim 21, wherein the visual quality parameters further comprise a value that indicates a change in intensity for a pixel, in the image, as represented between two consecutive decompressed video frames, and a value that indicates an extent of high contrast details in a pixel included in the image." and insert -- One or more computer-readable storage memories of claim 21, wherein estimating the visual quality parameters further comprises estimating a value that indicates a change in intensity for a pixel in the image between two consecutive frames of the decompressed video and a value that indicates an extent of high contrast details in a pixel included in the image. --, therefor.

In column 14, line 17, in Claim 27, after "using" delete "on".

In column 14, lines 43-49, in Claim 33, delete "One of more computer-readable storage memories of claim 21, wherein estimating the visual quality parameters further comprises estimating a value that indicates a change in intensity for a pixel in the image between two consecutive frames of the decompressed video and a value that indicates an extent of high contrast details in a pixel included in the image." and insert -- The system of claim 27, wherein the means for generating further comprises means for generating a value that indicates an extent to which the image in the particular frame has changed in comparison to a previous image in a previous frame of the decompressed video frames, and wherein the means for improving further comprises means for implementing the value to improve the image in the particular frame. --, therefor.

In column 14, line 56, in Claim 35, delete "a" and insert -- in a --, therefor.

In column 15, line 4, in Claim 36, after "more" delete "a".

Signed and Sealed this
Eighteenth Day of January, 2011

David J. Kappos
*Director of the United States Patent and Trademark Office*